(12) United States Patent
Oh et al.

(10) Patent No.: US 12,072,862 B2
(45) Date of Patent: Aug. 27, 2024

(54) METHOD AND DEVICE FOR MANAGING THE INDEX PERFORMED IN ACTIVE-ACTIVE DATABASE CLUSTER ENVIRONMENT

(71) Applicant: TmaxTibero Co., Ltd., Seongnam-si (KR)

(72) Inventors: Jaemin Oh, Seongnam-si (KR); Sehyeon Oh, Seongnam-si (KR); Hakju Kim, Gwangju-si (KR); Dongyun Yang, Seoul (KR); Sangyoung Park, Seoul (KR)

(73) Assignee: TmaxTibero Co., Ltd., Seongnam-si (KR)

( * ) Notice: Subject to any disclaimer, the term of this patent is extended or adjusted under 35 U.S.C. 154(b) by 0 days.

(21) Appl. No.: 17/973,248

(22) Filed: Oct. 25, 2022

(65) Prior Publication Data

US 2023/0376471 A1 Nov. 23, 2023

(30) Foreign Application Priority Data

May 23, 2022 (KR) .......................... 10-2022-0062559

(51) Int. Cl.
*G06F 16/22* (2019.01)
*G06F 16/23* (2019.01)

(52) U.S. Cl.
CPC ...... *G06F 16/2246* (2019.01); *G06F 16/2379* (2019.01)

(58) Field of Classification Search
CPC .......................... G06F 16/2246; G06F 16/2379
(Continued)

(56) References Cited

U.S. PATENT DOCUMENTS 5,758,356 A * 5/1998 Hara ................... G06F 16/2246
707/696
6,012,060 A * 1/2000 Loaiza ..................... G06F 9/52
707/999.008
(Continued)

FOREIGN PATENT DOCUMENTS

CA 1285072 C * 6/1991 ....... G06F 17/30327
CN 104573428 A * 4/2015 ............. G06F 3/062
(Continued)

OTHER PUBLICATIONS

Swathi et al., "GLIP: A Concurrency Control Protocol For Clipping Indexing", International Conference on Advanced Computing, Communication and Network' 11, Seek Digital Library, 2011, pp. 282-286 (Year: 2011).*

*Primary Examiner* — Phuong Thao Cao
(74) *Attorney, Agent, or Firm* — Seed IP Law Group LLP

(57) ABSTRACT

Disclosed is a method including setting an exclusive modification authority of a first instance for a first data block (FDB) corresponding to a first transaction of the first instance. The FDB is related to a first index node group which participates in an index structure change which occurs by the first transaction. The method includes verifying the exclusive modification authority of a second data block (SDB) corresponding to a second transaction of a second instance. The SDB is related to a second index node group which participates in the index structure change which occurs by the second transaction. When the exclusive modification authority of the first instance for at least a part of the SDB is identified, the method includes making an access of the second transaction of modifying a data block in which the exclusive modification authority of the first instance is set in the SDB be waited.

18 Claims, 18 Drawing Sheets

(58) Field of Classification Search
USPC .......................................................... 707/797
See application file for complete search history.

(56) References Cited

U.S. PATENT DOCUMENTS

| | | | | |
|---|---|---|---|---|
| 6,026,406 | A * | 2/2000 | Huang | G06F 16/2343 |
| 6,484,172 | B1 * | 11/2002 | Lee | G06F 16/2343 |
| 7,600,063 | B2 * | 10/2009 | Loaiza | G06F 9/526 |
| | | | | 710/200 |
| 8,176,023 | B2 | 5/2012 | Graefe | |
| 11,645,254 | B2 * | 5/2023 | Li | G06F 16/2246 |
| | | | | 707/696 |
| 2008/0071997 | A1 * | 3/2008 | Loaiza | G06F 9/526 |
| | | | | 710/200 |
| 2013/0166855 | A1 * | 6/2013 | Batwara | G06F 12/0802 |
| | | | | 711/154 |
| 2014/0074841 | A1 * | 3/2014 | Majnemer | G06F 16/2246 |
| | | | | 707/E17.002 |
| 2015/0052104 | A1 * | 2/2015 | Shadmon | G06F 16/2343 |
| | | | | 707/613 |
| 2015/0142733 | A1 * | 5/2015 | Shadmon | G06F 16/21 |
| | | | | 707/769 |
| 2015/0254344 | A1 * | 9/2015 | Kulkarni | G06F 16/951 |
| | | | | 707/747 |
| 2015/0317327 | A1 * | 11/2015 | He | G06F 16/81 |
| | | | | 707/693 |
| 2016/0350352 | A1 * | 12/2016 | Hase | G06F 16/27 |
| 2018/0165327 | A1 * | 6/2018 | Graefe | G06F 16/2246 |
| 2019/0392047 | A1 * | 12/2019 | Sorenson, III | G06F 16/172 |
| 2020/0341674 | A1 * | 10/2020 | Zhang | G06F 11/1469 |
| 2021/0216213 | A1 * | 7/2021 | Shveidel | H04L 67/1001 |
| 2022/0222201 | A1 * | 7/2022 | Shveidel | G06F 15/17331 |

FOREIGN PATENT DOCUMENTS

| | | |
|---|---|---|
| EP | 0567999 A2 * | 11/1993 |
| KR | 10-2020-0056990 A | 5/2020 |
| WO | WO 2019/035878 A1 | 2/2019 |

* cited by examiner

| TRANSACTION | Status | Commit (Rollback) Time |
|---|---|---|
| TX A | Active | |
| TX B | Commit | 0x00001ab6 |
| TX C | Rollback | 0x00002c15 |
| . | . | . |
| . | . | . |

METHOD AND DEVICE FOR MANAGING THE INDEX PERFORMED IN ACTIVE-ACTIVE DATABASE CLUSTER ENVIRONMENT

CROSS-REFERENCE TO RELATED APPLICATIONS

This application claims priority to and the benefit of Korean Patent Application No. 10-2022-0062559 filed in the Korean Intellectual Property Office on May 23, 2022, the entire contents of which are incorporated herein by reference.

BACKGROUND

Technical Field

The present disclosure relates to a computer technology field, and more particularly, to a method and a device for managing the index in an active-active database cluster environment.

Description of the Related Art

A B-tree index is frequently used as a data structure for aligning data according to a specific criterion in order to quickly access desired data on a database. In the B-tree index, an index key configured as a part of original data and an address for the original data are stored in the form of a pair of data. In the B-tree index, the index key is used for identifying the original data and the address for the original data is used for accessing the original data (entire data). To this end, when new data is inserted or existing data is deleted or modified, the index key stored in the B-tree index and the address for the original data are also modified jointly. For example, when the new data is inserted, a pair of the index key and address information of the original data having access information to the corresponding data should be inserted into the B-tree index. Similarly, even when the existing data is deleted or modified, a pair of the index key and the original data address information having the access information to the corresponding data should be deleted or modified on the B-tree index. That is, a pair of index key and address information stored in the B-tree index is changed with a change in data, and as a result, the original data and the B-tree index should be synchronized to have an integrity.

BRIEF SUMMARY

In an active-active DB cluster environment, two or more database instances can constitute one DB cluster. Respective instances constituting the DB cluster can simultaneously perform an index search and modification task by accessing the B-tree index.

When a situation in which multiple instances constituting the DB cluster simultaneously modify a specific index block frequently occurs (inter-instance hot block contention) or a task of a transaction of performing a change in index structure is lengthened (e.g., there are a lot of nodes which should be modified for changing the index structure), a problem in that network and CPU resources are unnecessarily and excessively used in each instance occurs.

In order to exemplarily describe the problem, it is assumed that the active-active DB cluster is constituted by instance '#0', instance '#1', and instance '#2', and an index structure change operation is performed by transaction A of instance '#0'. In this case, the transaction of instance '#1' or instance '#2' identifies information marked in corresponding index nodes before attempting an access for modifying a specific index node to verify that the structure change of the index by transaction A is being performed. Therefore, the transaction of instance '#1' or instance '#2' which intends to modify the corresponding index nodes can request a transaction table to instance '#0' in order to check whether transaction A is committed or rolled back. Instance '#0' which receives a request for transmission of the transaction table can transmit the transaction table to instances (or transactions) which request the transaction table. When the transaction of instance '#1' or instance '#2' which refers to the transaction table verifies that transaction A is 'active', a modification task for the corresponding index nodes should be waited until the state of transaction A is 'committed' or 'rolled back'. In such a state, other transactions of modifying the corresponding index node can occur in instance '#1' or instance '#2' until the state of transaction A is 'committed' or 'rolled back'. In this case, transactions which occur newly additionally transmit the request for the transaction table to instance '#0' in order to check whether transaction A is committed or rolled back again. By such a method, the request for the transaction table unnecessary occurs several times.

In the process of conducting the index structure change by transaction A of instance '#0', a specific index node may be modified twice or more according to a structure change purpose and a structure change method. As such, when the specific index node is modified twice or more, there may be inefficiency that an index node (data block) is unnecessarily exchanged between instances. For example, it is assumed that after transaction A modifies the specific index node, the transaction of instance '#1' or instance '#2' requests and receives a corresponding data block to instance '#0' in order to modify the corresponding index node. In this case, transaction A of instance '#0' should request and receive the corresponding index node (data block) to instance '#1' or instance '#2' again at the time of modifying the corresponding index node again. That is, since the transaction of instance '#1' or instance '#2' requests and receives the corresponding index node to instance '#0' even though the transaction cannot modify an index node which participates in the index structure change, the transaction unnecessarily requests and receives the index node (data block) which is present in instance '#1' or instance '#2' at the time of remodifying the index node in instance '#0'.

In particular, due to structural characteristics of the B-tree index, all index keys are aligned based on a size of an index key value and inserted into the index node. Therefore, in a load environment in which a simultaneous modification task should be performed in the same or contiguous index key, index node contention between instances and the index structure change occur very frequently. In the load environment, a phenomenon in which network and CPU resources are unnecessarily and excessively used is more prominent, and as a result, a problem in that load processing performance of the DB cluster deteriorates is caused. Moreover, a degree of the resource waste becomes more severe as the number of instances constituting the DB cluster increases, which causes deterioration of scalability of the DB cluster.

One or more embodiments of the present disclosure address the various technical problems in the related art including the technical problem identified above by the inventors.

One or more embodiments of the present disclosure provide a method and a device for managing the index in an active-active database cluster environment.

An example embodiment of the present disclosure provides a method for managing an index, which is performed by a computing device in an active-active database cluster environment. The method may include: setting an exclusive modification authority of a first instance for a first data block corresponding to a first transaction of the first instance, wherein the first data block is related to a first index node group which participates in an index structure change which occurs by the first transaction; verifying the exclusive modification authority of a second data block corresponding to a second transaction of a second instance, wherein the second data block is related to a second index node group which participates in the index structure change which occurs by the second transaction; and when the exclusive modification authority of the first instance for at least a part of the second data block is identified, making an access of the second transaction of modifying a data block in which the exclusive modification authority of the first instance is set in the second data block be waited.

Alternatively, the setting of the exclusive modification authority of the first instance for the first data block corresponding to the first transaction of the first instance may include when the index structure change occurs by the first transaction, determining the first index node group which participates the index structure change which occurs by the first transaction, verifying the exclusive modification authority for the first data block related to the first index node group by referencing an instance memory area of the first instance, and when the exclusive modification authority for the first data block is not set, setting the exclusive modification authority of the first instance for the first data block.

Alternatively, the setting of the exclusive modification authority of the first instance for the first data block corresponding to the first transaction of the first instance may further include storing first modification authority information for setting the exclusive modification authority of the first instance for the first data block in the instance memory area of the first instance, and transmitting the first modification authority information to a memory area of the second instance to store the first modification authority information in the instance memory area of the second instance.

Alternatively, the setting of the exclusive modification authority of the first instance for the first data block corresponding to the first transaction of the first instance may further include storing identification information for the first index node group in a transaction memory area of the first transaction.

Alternatively, the method may further include setting the exclusive modification authority of the first instance for the first data block, and then modifying the first data block by the first transaction so as to perform the index structure change which occurs by the first transaction, and the modifying of the first data block by the first transaction to perform the index structure change which occurs by the first transaction may include in the case of modifying the first data block by the first transaction, displaying that the index structure change is being conducted by the first transaction on the first index node group which participates in the index structure change.

Alternatively, the verifying of the exclusive modification authority of the second data block corresponding to the second transaction of the second instance may include verifying the exclusive modification authority for the second data block by referencing the instance memory area of the second instance.

Alternatively, the method may further include canceling the exclusive modification authority of the first instance for the first data block when the first transaction is committed or rolled back after the exclusive modification authority of the first instance for the first data block is set.

Alternatively, the canceling of the exclusive modification authority of the first instance for the first data block may include canceling the first modification authority information on the instance memory area of the first instance by referencing the identification information for the first index node group stored in the transaction memory area of the first transaction, and transmitting second modification authority information for canceling the first modification authority information on the instance memory area of the second instance to the instance memory area of the second instance.

Alternatively, the method may further include when the exclusive modification authority of the first instance for the first data block is cancelled, setting the exclusive modification authority of the second instance for a data block in which the exclusive modification authority of the first instance is cancelled in the second data block.

Alternatively, the method may further include when the exclusive modification authority of the second instance is set for the data block in which the exclusive modification authority of the first instance in the second data block is cancelled, permitting the access of the second transaction of modifying the data block in which the exclusive modification authority of the first instance is cancelled in the second data block.

Alternatively, the permitting of the access of the second transaction of modifying the data block in which the exclusive modification authority of the first instance is cancelled in the second data block may include after the exclusive modification authority of the second instance is set for the data block in which the exclusive modification authority of the first instance in the second data block is cancelled, accessing the second data block by the second transaction in order to perform the index structure change which occurs by the second transaction, in the case of accessing the second data block by the second transaction, the checking whether there is the index node displaying that the index structure change is being conducted in the second index node group which participates in the index structure change which occurs by the second transaction, when verifying the index node displaying that the index structure change is being conducted by the first transaction in the second index node group, requesting a transaction table to the first instance by the second transaction, and when verifying that the first transaction is committed or rolled back based on the transaction table, modifying the second data block by the second transaction so as to perform the index structure change which occurs by the second transaction.

Alternatively, the modifying of the second data block by the second transaction to perform the index structure change which occurs by the second transaction may include in the case of modifying the second data block by the second transaction, displaying that the index structure change is being conducted by the second transaction on the second index node group which participates in the index structure change.

Alternatively, the method may further include permitting the access of the transaction of the second instance without verifying the exclusive modification authority for the referenced data block when the transaction of the second instance references the data block.

Alternatively, the index may include a B-tree index.

Another example embodiment of the present disclosure provides a database server performing a method for managing an index. The server may include: a processor including at least one core; and a memory including program codes executable by the processor, in which the processor may perform an operation of setting an exclusive modification authority of a first instance for a first data block corresponding to a first transaction of the first instance, wherein the first data block is related to a first index node group which participates in an index structure change which occurs by the first transaction, an operation of verifying the exclusive modification authority of a second data block corresponding to a second transaction of a second instance, wherein the second data block is related to a second index node group which participates in the index structure change which occurs by the second transaction, and when the exclusive modification authority of the first instance for at least a part of the second data block is identified, an operation of making an access of the second transaction of modifying a data block in which the exclusive modification authority of the first instance is set in the second data block be waited.

Still another example embodiment of the present disclosure provides a non-transitory computer-readable storage medium storing a computer program. The computer program is configured to cause one or more processors to perform operations for performing a method for managing an index when the computer program is executed by one or more processors and the method may include: setting an exclusive modification authority of a first instance for a first data block corresponding to a first transaction of the first instance, in which the first data block is related to a first index node group which participates in an index structure change which occurs by the first transaction; verifying the exclusive modification authority of a second data block corresponding to a second transaction of a second instance, in which the second data block is related to a second index node group which participates in the index structure change which occurs by the second transaction; and when the exclusive modification authority of the first instance for at least a part of the second data block is identified, making an access of the second transaction of modifying a data block in which the exclusive modification authority of the first instance is set in the second data block be waited.

According to example embodiments of the present disclosure, provided are a method and a device for managing the index in an active-active database cluster environment.

Effects which can be obtained in the present disclosure are not limited to the aforementioned effects and other unmentioned effects will be clearly understood by those skilled in the art from the following description.

DETAILED DESCRIPTION

Figure 1:
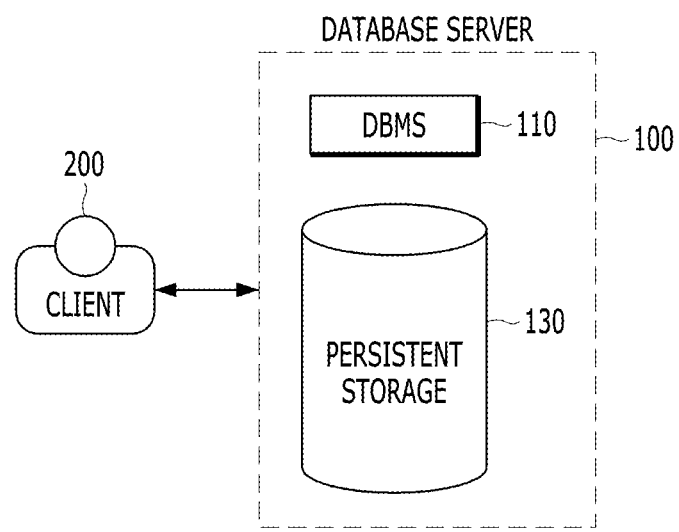
FIG. 1 is a schematic view of a database system 10 according to some example embodiments of the present disclosure.

Various example embodiments will now be described with reference to drawings. In the present specification, various descriptions are presented to provide appreciation of the present disclosure. However, it is apparent that the example embodiments can be executed without the specific description.

"Component", "module", "system", and the like which are terms used in the specification refer to a computer-related entity, hardware, firmware, software, and a combination of the software and the hardware, or execution of the software. For example, the component may be a processing procedure executed on a processor, the processor, an object, an execution thread, a program, and/or a computer, but is not limited thereto. For example, both an application executed in a computing device and the computing device may be the components. One or more components may reside within the processor and/or a thread of execution. One component may be localized in one computer. One component may be distributed between two or more computers. Further, the components may be executed by various computer-readable media having various data structures, which are stored therein. The components may perform communication through local and/or remote processing according to a signal (for example, data transmitted from another system through a network such as the Internet through data and/or a signal from one component that interacts with other components in a local system and a distribution system) having one or more data packets, for example.

The term "or" is intended to mean not exclusive "or" but inclusive "or". That is, when not separately specified or not clear in terms of a context, a sentence "X uses A or B" is intended to mean one of the natural inclusive substitutions. That is, the sentence "X uses A or B" may be applied to any of the case where X uses A, the case where X uses B, or the case where X uses both A and B. Further, it should be understood that the term "and/or" used in this specification designates and includes all available combinations of one or more items among enumerated related items.

It should be appreciated that the term "comprise" and/or "comprising" means presence of corresponding features and/or components. However, it should be appreciated that the term "comprises" and/or "comprising" means that presence or addition of one or more other features, components, and/or a group thereof is not excluded. Further, when not separately specified or it is not clear in terms of the context that a singular form is indicated, it should be construed that the singular form generally means "one or more" in this specification and the claims.

The term "at least one of A or B" should be interpreted to mean "a case including only A", "a case including only B", and "a case in which A and B are combined".

Those skilled in the art need to recognize that various illustrative logical blocks, configurations, modules, circuits, means, logic, and algorithm steps described in connection with the example embodiments disclosed herein may be additionally implemented as electronic hardware, computer software, or combinations of both sides. To clearly illustrate the interchangeability of hardware and software, various illustrative components, blocks, configurations, means, logic, modules, circuits, and steps have been described above generally in terms of their functionalities. Whether the functionalities are implemented as the hardware or software depends on a specific application and design restrictions given to an entire system. Skilled artisans may implement the described functionalities in various ways for each particular application. However, such implementation decisions should not be interpreted as causing a departure from the scope of the present disclosure.

The description of the presented example embodiments is provided so that those skilled in the art of the present disclosure use or implement the present disclosure. Various modifications to the example embodiments will be apparent to those skilled in the art. Generic principles defined herein may be applied to other embodiments without departing from the scope of the present disclosure. Therefore, the present disclosure is not limited to the example embodiments presented herein. The present disclosure should be analyzed within the widest range which is coherent with the principles and new features presented herein.

FIG. 1 is a schematic view of a database system 10 according to an example embodiment of the present disclosure.

As illustrated in FIG. 1, the database system 10 according to the present disclosure may include a client 200 and a database server 100. The database server 100 in the present specification may be used interchangeably with a database.

As illustrated in FIG. 1, the client 200 may mean a node(s) in a database system having a mechanism for communication through a network. For example, the client 200 may include a predetermined electronic device having connectivity with a personal computer (PC), a laptop computer, a workstation, a terminal, and/or the network. Further, the client 200 may include a predetermined server implemented by at least one of agent, application programming interface (API), and plug-in. For example, the client 200 in FIG. 1 may be associated with a user (e.g., database administration (DBA)) using the database server 100. In such an example, the client 200 may issue to the database server 100 various types of queries including a DML and a data definition language (DDL).

The database server 100 may include, for example, a predetermined type of computer system or computing device such as a microprocessor, a mainframe computer, a digital single processor, a portable device, and a device controller. Each of the database servers 100 may include a database management system (DBMS) 110 and a persistent storage 130.

In FIG. 1, only one database server 100 is illustrated, but it will be apparent to those skilled in the art that database servers may also be included in the scope of the present disclosure and the database server 100 may include additional components. That is, the database server 100 may be constituted by a plurality of computing devices. A set of a plurality of nodes may constitute the database server 100. For example, although not illustrated in FIG. 1, the database server 100 may include one or more memories including a buffer cache. Further, although not illustrated in FIG. 1, the database server 100 may include one or more processors 120. Therefore, the DBMS 110 may be operated by the processor 120 on the memory.

The memory in the present specification as a primary storage device directly accessed by the processor, such as a random access memory (RAM) including a dynamic random access memory (DRAM), a static random access memory (SRAM), etc., may mean a volatile storage device in which stored information is momentarily erased when power is turned off, but is not limited thereto. The memory may be operated by the processor 120. The memory may temporarily store a data table including a data value. The data table may include the data value and in an example embodiment of the present disclosure, the data value of the data table may be written in the persistent storage 130 from the memory. In an additional aspect, the memory may include a buffer cache and the buffer cache may store data in the form of a data block. The data stored in the buffer cache may be written in the persistent storage 130 by a background process.

The persistent storage 130 may mean a non-volatile storage medium which may consistently store predetermined data, such as a magnetic disk, an optical disk, and a magneto-optical storage device and a storage device based on a flash memory and/or a battery-backup memory. The persistent storage 130 may communicate with the processor 120 and the memory of the database server 100 through various communication means. In an additional example embodiment, the persistent storage 130 is positioned outside the database server 100 to communicate with the database server 100. According to an example embodiment of the present disclosure, the persistent storage 130 and the memory may be collectively called a storage unit 140.

The DBMS 110 as a program for permitting the database server 100 to perform operations including parsing of a query, retrieval, insertion, modification, deletion, index generation, and/or index access of required data may be implemented by the processor 120 in the memory of the database server 100 as described above.

The client 200 and the database server 100 or the database servers may also communicate with each other through the network (not illustrated). The network according to the example embodiment of the present disclosure may use various wired communication systems such as public switched telephone network (PSTN), x digital subscriber line (xDSL), rate adaptive DSL (RADSL), multi rate DSL (MDSL), very high speed DSL (VDSL), universal asymmetric DSL (UADSL), high bit rate DSL (HDSL), and local area network (LAN).

The network presented in this specification may use various wireless communication systems such as code division multi access (CDMA), time division multi access (TDMA), frequency division multi access (FDMA), orthogonal frequency division multi access (OFDMA), single carrier-FDMA (SC-FDMA), and other systems. For example, the network may include a database link (dblink), and as a result, a plurality of database servers communicates with each other through the database link to fetch data from another database server 100. The techniques described in this specification may also be used in other networks in addition to the aforementioned networks.

Figure 2:
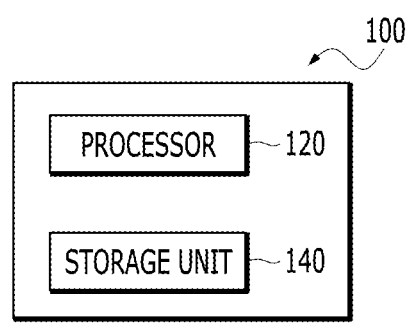
FIG. 2 is a block diagram of a database server 100 according to some example embodiments of the present disclosure.

FIG. 2 is a block diagram of a database server 100 according to an example embodiment of the present disclosure.

As illustrated in FIG. 2, the database server 100 may include a processor 120 and a storage unit 140. Here, the storage unit 140 may be a concept collectively referred to as the memory and the persistent storage 130 as described above with reference to FIG. 1. In addition, the DBMS 110 may be executed by the processor 120 and stored in the memory and/or the persistent storage 130. In this case, the storage unit 140 communicates with the processor 120 to control data storage/management.

The processor 120 executes the DBMS 110 on the memory to perform various operations to be described below. For example, the processor may implement the DBMS 110 constituted by a DB instance process on the OS. Each DB instance may have a buffer cache in the storage unit 140 for the purpose of caching data to be modified and referenced. The DB instance may format data in the form of data block and load the data on the buffer cache. In this case, the DB instance may modify and reference data through the buffer cache. When the DBMS 110 is implemented by using an active clustering scheme, the processor 120 may constitute the DBMS 110 by using a plurality of DB instances. In this case, the database may be a sharing storage accessible by all instances constituting the active cluster. In the active cluster environment, each instance may load desired data on the buffer cache thereof in the form of the data block, and receive the data block loaded on the buffer cache of the other instance through the network. Through this, all instances which belong to the active cluster may reference and modify the same data block.

The processor 120 may generate an index in order to increase a data retrieve speed from the database. For example, the processor 120 may generate a B-tree index for the data block loaded on the buffer cache. In the B-tree index, an index key configured as a part of original data and an address for the original data may be stored in the form of a pair of data. In the B-tree index, the index key may be used for identifying the original data. Further, in the B-tree index, the address for the original data (e.g., the data block stored in the buffer cache) may be used for accessing the original data (entire data). To this end, when new data is inserted or existing data is deleted or modified, the processor 120 may modify the index key stored in the B-tree index and the address for the original data.

The storage unit 140 according to an example embodiment of the present disclosure may store predetermined data stored in relation with the DB instance process of the database server 100. The storage unit 140 may include the DBMS 110 and/or the persistent storage 130. When the DBMS 110 is implemented by using the active clustering scheme, the storage unit 140 may provide the sharing storage accessible by all instances constituting the active cluster. Additionally, the storage unit 140 may generate a table (e.g., index table) and the like on the database server 100. Further, the storage unit 140 may process and manage a request related to the storing (including the update) of the data. The storage unit 140 may decide to store the data and the index table. Further, the storage unit 140 may decide a storage location for the data and/or the index table. For example, the storage unit 140 may decide the storage location of the data on the data table. As another example, the storage unit 140 may decide the storage location of the data on the persistent storage 130. The storage unit 140 may store the structure (e.g., the structure of the B-tree index) of the generated database index by the unit of the data block. Further, the storage unit 140 may provide an instance memory area that manages an exclusive modification authority of each instance included in the DB cluster. Further, the storage unit 140 may provide a transaction memory area in which the transactions belonging to the instance are capable of storing information related to the task.

According to some example embodiments of the present disclosure, the processor 120 may group index nodes (or data blocks) that change the structure of the index when conducting the modification task for the B-tree index in the active-active database (DB) cluster environment. In addition, the processor 120 manages the modification authority for the grouped index node for each instance, and as a result, unnecessary data transmission and CPU use may be reduced, which occur between the instances constituting the DB cluster. Hereinafter, an example embodiment in which the processor 120 performs the method for managing the index performed in the active-active database cluster environment according to the present disclosure will be described.

According to some example embodiments of the present disclosure, the processor 120 may set an exclusive modification authority of a first instance for a first data block corresponding to a first transaction of the first instance. Here, the first data block may be related to a first index node group which participates in the index structure change which occurs by the first transaction.

In the active-active database cluster environment the DB cluster may include a plurality of instances. For example, the DB cluster may include a first instance, a second instance, a third instance, etc. Each of the plurality of instances may simultaneously access the index in order to reference or modify the index. Each of the plurality of instances may include transactions that process the data block corresponding to the index node in order to change the structure of the index. For example, the first instance may include the first transaction of performing an operation of changing the structure of the index. Further, the second instance may include the second transaction of performing the operation of changing the structure of the index. In order to prevent the data block processed by the first transaction from being changed by the other transaction, the exclusive modification authority of the first instance may be set for the data block to be processed by the first transaction.

Specifically, in order to prevent the integrity of the index structure from being broken in the process of managing the index for the plurality of instances, the change of the index structure is performed 'atomically' for one transaction. By atomicity which is a basic attribute of the transaction, all modification contents for all nodes which participate in the index structure change may be reflected on the database or not reflected on the database. Through this, only some modification contents are reflected onto the database to prevent a state in which the structure of the index does not reflect on an actual structure of the data. For this purpose, the method for managing the index according to the present disclosure may set the exclusive modification authority before changing the structure of the index for the instance including each transaction.

The first data block corresponding to the first transaction of the first instance may include a data block related to the index nodes modified by the first transaction. Here, the index node modified by the first transaction may be referred to as a first index node group. In other words, the first data block may be related to the first index node group which participates in the index structure change which occurs by the first transaction. The first instance may have the exclusive modification authority for the first data block so as to prevent the index node from being modified by the other transaction before the operation of modifying the index node is completed by the first transaction. When the first instance has the exclusive modification authority for the first data block, the transaction of the other instance of the DB cluster may not be accessed in order to modify the first data block. In this case, the transaction of the other instance may wait for accessing the first data block until the exclusive modification authority for the first data block is cancelled. Example detailed operations of setting the exclusive modification authority for the instance before changing the structure of the index will be described below.

In some example embodiments of the present disclosure, when the processor 120 sets the exclusive modification authority of the first instance for the first data block corresponding to the first transaction of the first instance, if the index structure change occurs by the first transaction, the processor 120 may determine the first index node group which participates in the index structure change which occurs by the first transaction. In addition, the processor 120 may confirm the exclusive modification authority for the first data block related to the index node group by referencing the instance memory area of the first instance. In addition, when the exclusive modification authority for the first data block is not set, the processor 120 may set the exclusive modification authority of the first instance for the first data block.

When the index structure change occurs by the first transaction, the first instance including the first transaction may be set with the exclusive modification authority for the first data block related to the index structure change. For example, when the index structure change occurs by the first transaction, the first index node group may be determined, which is constituted by the index nodes changed by the first transaction. In addition, the processor 120 may confirm the exclusive modification authority for the first data block related to the first index node group. In some examples, the exclusive modification authority may be managed for each instance, and information on which instance having the exclusive modification authority for which data block (related to the index node) may be stored in the instance memory area. Here, the instance memory area may be a memory area individually allocated to each instance. When the exclusive modification authority is set and cancelled, the instance memory area of each of the plurality of instances may send and receive information on the exclusive modification authority to and from each other. In this case, in order to confirm the exclusive modification authority for the data block to be modified by the transaction of each instance, the corresponding transaction may reference the instance memory area of the instance to which the corresponding transaction belongs instead of requesting the transaction table to the other instance. For example, before setting the exclusive modification authority of the first instance for the first data block, the exclusive modification authority for the first data block may be verified by referencing the instance memory area of the first instance. When the exclusive modification authority for the first data block of the first instance is not identified, the processor 120 may set the exclusive modification authority of the first instance for the first data block in order to prevent modification of the first data block by the transaction of the other instance. However, the present disclosure is not limited thereto, and the exclusive modification authority may be set in various schemes, and information on the exclusive modification authority may be stored in the other memory area in addition to the instance memory area.

In some example embodiments of the present disclosure, when the processor 120 sets the exclusive modification authority of the first instance for the first data block corresponding to the first transaction of the first instance, the processor 120 may store first modification authority information for setting the exclusive modification authority of the first instance for the first data block in the instance memory area of the first instance. In addition, the processor 120 may transmit the first modification authority information to the instance memory area of the second instance in order to store the first modification authority information in the instance memory area of the second instance.

When the information on the exclusive modification authority is managed by each instance memory area, respective instance memory areas may send and receive information on an updated exclusive modification authority so that transactions of each instance may confirm the updated exclusive modification authority by referencing the instance memory area of the instance to which the transaction of each instance belong. For example, when the exclusive modification authority of the first instance for the first data block is set, the first modification authority information for setting the exclusive modification authority of the first instance for the first data block may be stored in the instance memory area of the other instance in addition to the instance memory area of the first instance. To this end, the first modification authority information may be transmitted to the instance memory area of the second instance to be stored in the instance memory area of the second instance. Therefore, the transaction of each instance may confirm the exclusive modification authority by referencing the instance memory area of the instance to which the instance belongs. However, the present disclosure is not limited thereto, and the information on the exclusive modification authority may be stored and transmitted/received by various schemes.

According to some example embodiments of the present disclosure, when the processor 120 sets the exclusive modification authority of the first instance for the first data block corresponding to the first transaction of the first instance, the processor 120 may additionally store identification information for the first index node group in the transaction memory area of the first transaction.

In the process of changing the index structure by the transaction, the index node group (e.g., the first index node group in the above-described example) which participates in the index structure change may be determined. In addition, the identification information for the index node group may be stored in the transaction memory area. Here, the transaction memory area may be a memory area with which each transaction is allocated for the purpose of recoding task information thereof. In some examples, the transaction memory area may be cancelled when each transaction is committed or rolled back. In other words, the transaction memory area may have the same life cycle as each transaction. In some examples, when the first index node group is determined, the identification information for the first index node group may be stored in the transaction memory area of the first transaction. The identification information for the first index node group may be used for identifying the first data block (or first index node group) in the process of canceling the exclusive modification authority of the first instance for the first data block as described below in detail. However, the present disclosure is not limited thereto, and the identification information for the index node group may be stored by various schemes.

In some example embodiments of the present disclosure, the processor 120 may set the exclusive modification authority of the first instance for the first data block, and then modify the first data block by the first transaction so as to perform the index structure change which occurs by the first transaction. Further, in the case of modifying the first data block by the first transaction, the processor 120 may display that the index structure change is being conducted by the first transaction on the first index node group which participates in the index structure change.

When the exclusive modification authority of the first instance is set in order to prevent modification of the first data block by the transaction of the other instance, the first transaction accesses the first data block and modifies the first data block to perform the index structure change. While the index structure change is performed by the first transaction, each index node of the first index node group which participates in the index structure change by the first transaction may display that the index structure change is being conducted by the first transaction. Then, other transactions (e.g., second transaction) may check whether there is the index node displaying that the index structure change is being conducted among index nodes to be accessed and modified before performing the index structure change. As described below, when the other transaction verifies the index node displaying that the index structure change is being conducted by the first transaction, the other transaction may request the transaction table to the first instance to which the first transaction conducting the index structure change belongs. In this case, the other transaction checks whether the first transaction is committed or rolled back by referencing the transaction table to thereby wait for the index structure change or immediately initiate the index structure change.

In some example embodiments of the present disclosure, the processor 120 may confirm the exclusive modification authority for the second data block corresponding to the second transaction of the second instance. Here, the second data block may be related to a second index node group which participates in the index structure change which occurs by the second transaction.

As described above, in the active-active database cluster environment, respective transactions of different instances may simultaneously access the index in order to reference or modify the index. For example, while a first operation of changing the structure of the index is performed by the first transaction of the first instance, a preparation for performing a second operation of changing the structure of the index may be made by the second transaction of the second instance. In this case, in order to maintain the integrity of the index, the second transaction should check whether there is a data block in which the exclusive modification authority of the other instance is set in the data block related to the index node modified by the second operation. The index node modified by the second transaction may be referred to as the second index node group. The second data block may be related to the second index node group which participates in the index structure change which occurs by the second transaction. Similarly to the case of the first data block, when the exclusive modification authority of the other instance is not identified for the second data block, the exclusive modification authority of the second instance for the second data block may be set in order to prevent modification of the second data block by the transaction of the other instance. Unlike this, when the exclusive modification authority of the other instance (e.g., the first instance) is identified for a part or the entirety of the second data block, the access of the second transaction may be restricted.

According to some example embodiments of the present disclosure, when the processor 120 verifies the exclusive modification authority for the second data block corresponding to the second transaction of the second instance, the processor 120 may confirm the exclusive modification authority for the second data block by referencing the instance memory area of the second instance.

As described above, the exclusive modification authority may be managed for each instance, and information on which instance having the exclusive modification authority for which data block may be stored in the instance memory area. Similarly to the case of verifying the exclusive modification authority for the first data block related to the first index node group, the exclusive modification authority for the second data block may be verified by referencing the instance memory area of the second instance. Specifically, as described above, when the exclusive modification authority of the first instance for the first data block is set, the first modification authority information for setting the exclusive modification authority of the first instance for the first data block may be stored in the instance memory area of another instance in addition to the instance memory area of the first instance. Therefore, the first modification authority information may be transmitted to the instance memory area of the second instance to be stored in the instance memory area of the second instance. Therefore, the second transaction may confirm the exclusive modification authority for the second data block by referencing the instance memory area of the second instance. For example, when there is an overlapped data block between the second data block and the first data block, the exclusive modification authority of the first instance for the data block overlapped with the first data block in the second data block may be identified by using first modification authority information stored in the instance memory area of the second instance. Therefore, the second transaction of each second instance may confirm the exclusive modification authority for the second data block without a need for requesting the transaction table to the first instance. However, the present disclosure is not limited thereto, and the exclusive modification authority for the second data block may be verified by various schemes.

According to some example embodiments of the present disclosure, when the exclusive modification authority of the first instance for at least a part of the second data block is identified, the processor 120 may make the access of the second transaction of modifying the data block in which the exclusive modification authority of the first instance is set in the second data block be waited.

Specifically, when there is the data block in which the exclusive modification authority of the first instance is set in the second data block corresponding to the second transaction, it is beneficial to prevent the index structure change by the second transaction from occurring overlappingly until the index structure change by the first transaction is completed. Specifically, for example, the data blocks in which the exclusive modification authority of the first instance is set in the second data block may be referred to as a first group. Further, data blocks in which the exclusive modification authority of the other instance (e.g., the first instance) is not set in the second data block may be referred to as a second group. Since the first group is the data block which is being modified by the transaction of the other instance (e.g., the first instance), the processor 120 may restrict modification for the first group by the transaction of the other instance until the exclusive modification authority of the first instance is cancelled. As described above, when operations of changing the index structure are simultaneously performed by the transactions which belong to different instances, the integrity of the index may not be maintained and unnecessary data transmission/reception may occur. In order to prevent this, it is beneficial for first, after the first operation by the transaction of the first instance which obtains the exclusive modification authority is completed, the second operation by the transaction of the second instance be performed. To this end, when the exclusive modification authority of the first instance for a part or the entirety (i.e., the first group) of the second data block is identified, the processor 120 may make the access (specifically, an access for changing the index node) of the transaction which belongs to the second instance for the data block in which the exclusive modification authority of the first instance is set be waited. Specifically, the processor 120 may restrict the access of the second transaction for the first group until the exclusive modification authority of the first instance is cancelled.

According to some example embodiments of the present disclosure, the processor 120 may permit the access of the transaction of the second instance without verifying the exclusive modification authority for the referenced data block when the transaction of the second instance references the data block.

Unlike an operation of 'modifying' the data block which is being modified by the transaction which belongs to the first instance by the transaction which belongs to the other instance, an operation of 'referencing' the data block which is being modified by the transaction which belongs to the first instance by the transaction which belongs to the other instance for the index structure change is not related to the integrity of the index. Therefore, even though the exclusive modification authority of the first instance is set for the first data block, the access of the transaction of the other instance of 'referencing' the first data block need not be restricted. Specifically, when the transaction of the other instance references the data block, the transaction may access the data block without the need for verifying the exclusive modification authority for the referenced data block. In other words, in the case of 'referencing' the data block, the transaction may access the corresponding data block without checking whether there is the exclusive modification authority (or regardless of whether the corresponding data block being the data block related to the index).

In some example embodiments of the present disclosure, the processor 120 may cancel the exclusive modification authority of the first instance for the first data block when the first transaction is committed or rolled back after the exclusive modification authority of the first instance for the first data block is set.

When the exclusive modification authority of the first instance for the first data block is set, the processor 120 may change the structure of the index by processing the first operation of the first transaction while restricting an index related modification operation by the transaction of the other instance for the first data block. When the first operation is completed (e.g., when the first transaction is committed) or the first operation is cancelled (e.g., when the first transaction is rolled back), the processor 120 may cancel the exclusive modification authority of the first instance for the first data block so as to initiate the index structure change by the other instance related to the first data block. When the exclusive modification authority of the first instance is cancelled, the access of the second transaction to the data block (i.e., the first group) in which the exclusive modification authority of the first instance is cancelled in the second data block may be permitted. An example operation of canceling the exclusive modification authority of the first instance will be described below.

According to some example embodiments of the present disclosure, when the processor 120 cancels the exclusive modification authority of the first instance for the first data block, the processor 120 may cancel the first modification authority information on the instance memory area of the first instance by referencing the identification information for the first index node group stored in the transaction memory area of the first transaction. In addition, the processor 120 may transmit second modification authority information for canceling the first modification authority information on the instance memory area of the second instance to the instance memory area of the second instance.

Specifically, when the first transaction of the first instance completes the index structure change, the identification information for the first index node group stored previously may be used in order to cancel the exclusive modification authority of the first instance. For example, the first index node group of which modification is completed according to the index structure change may be identified by referencing the identification information for the first index node group stored in the transaction memory area of the first transaction. In this case, in order to cancel the exclusive modification authority of the first instance for the first data block (related to the first index node group), the first modification authority information for setting the exclusive modification authority of the first instance may be cancelled (e.g., deleted) on the instance memory area of the first instance. As described above, since the exclusive modification authority may be managed for each instance, the second modification authority information for announcing that the exclusive modification authority of the first instance is cancelled may be transmitted to the instance memory area of the other instance. For example, the second modification authority information may be information for requesting canceling the first modification authority information stored in each instance memory area. In this case, the transaction of each instance may check whether the exclusive modification authority of the first instance is cancelled by referencing the instance memory area of the instance to which the corresponding transaction belongs without requesting the transaction table to the other instance.

In some example embodiments of the present disclosure, when the exclusive modification authority of the first instance for the first data block is cancelled, the processor 120 may set the exclusive modification authority of the second instance for the data block in which the exclusive modification authority of the first instance is cancelled in the second data block.

As described, the DB cluster may include a plurality of instances. In this case, for example, while the first operation of changing the structure of the index is performed by the first transaction of the first instance, the processor 120 may make a preparation for performing a third operation of changing the structure of the index by a third transaction of a third instance in addition to the second operation of changing the structure of the index by the second transaction of the second instance. In order to prevent a problem in that the integrity of the index is broken by simultaneously performing the second operation and the third operation after the first operation is completed, the processor 120 may newly set the exclusive modification authority for the data block to be processed by the other instance in the first data block. For example, the processor 120 may make the accesses of the transactions of the second instance and the third instance of modifying the data block included in the first group be waited. When the exclusive modification authority of the first instance for the first data block is cancelled by committing or rolling back the first transaction, in the first data block the transaction of the second instance which waits for the access may set the exclusive modification authority for the second instance so as to initiate the modification task. An order in which the exclusive modification authority is set between two instances may be determined according to various schemes. For example, the exclusive modification authority may be sequentially set according to an order of requesting the exclusive modification authority between the transactions of two instances.

When the exclusive modification authority of the second instance for the second group is previously set, the second instance may have the exclusive modification authority for the entire second data block including the first group and the second group. In this case, the processor 120 may restrict the access of the other instance (e.g., the third instance) to the second data block in which the exclusive modification authority of the second instance is set until the second transaction is committed or completed.

According to some example embodiments of the present disclosure, when the exclusive modification authority of the second instance is set for the data block in which the exclusive modification authority of the first instance in the second data block is cancelled, the processor 120 may permit the access of the second transaction of modifying the data block in which the exclusive modification authority of the first instance is cancelled in the second data block.

When the exclusive modification authority of the first instance is cancelled, the second transaction which waits for the access may perform a task for the index structure change after the exclusive modification authority of the second instance to which the second transaction belongs is set. In this case, the second transaction may perform the index structure change in the state of restricting the index structure change of the transaction of the other instance. In addition, the transaction of the other instance may wait for accessing the data block until the exclusive modification authority for the second instance is cancelled. In addition, when the index structure change of the second transaction is completed to cancel the exclusive modification authority of the second instance, the instance to which the transaction of the other instance belongs obtains the exclusive modification authority to perform the index structure change.

According to some example embodiments of the present disclosure, when permitting the access of the second transaction of modifying the data block in which the exclusive modification authority of the first instance is cancelled in the second data block, the processor 120 may access the second data block by the second transaction in order to perform the index structure change which occurs by the second transaction after setting the exclusive modification authority of the second instance for the data block in which the exclusive modification authority of the first instance is cancelled in the second data block. In addition, in the case of accessing the second data block by the second transaction, the processor 120 may check whether there is the index node displaying that the index structure change is being conducted in the second index node group which participates in the index structure change which occurs by the second transaction. In addition, when the processor 120 verifies the index node displaying that the index structure change is being conducted by the first transaction in the second index node group, the processor 120 may request the transaction table to the first instance by the second transaction. In addition, when the processor 120 verifies that the first transaction is committed or rolled back based on the transaction table, the processor 120 may modify the second data block by the second transaction so as to perform the index structure change which occurs by the second transaction.

As described above, when the exclusive modification authority of the second instance is set for the data block in which the exclusive modification authority of the first instance in the second data block is cancelled, the second transaction may access all second data blocks including a data block of which access is restricted by the first instance. In this case, the second transaction may check whether there is the index node displaying that the index structure change is being conducted among the index nodes corresponding to the second data blocks. For example, as described above, while the index structure change is performed by the first transaction, the index node which belongs to the first index node group which participates in the index structure change by the first transaction may display that the index structure change is being conducted by the first transaction. In addition, the second transaction may check whether there is the index node displaying that the index structure change is being conducted in the second index node group when accessing the second data block. In this case, the second transaction may confirm the index node displaying that the index structure change is being conducted by the first transaction in the second index node group. In addition, the second transaction may request the transaction table to the first instance in order to check whether the first transaction is committed or rolled back. Since the first transaction is committed or rolled back and the exclusive modification authority of the first instance is cancelled, the second transaction may confirm that the first transaction is committed or rolled back by referencing the transaction table requested to the first instance. Since it may be verified that the first transaction is committed or rolled back, the second transaction may perform the index structure change by modifying the second data block.

According to some example embodiments of the present disclosure, in the case of modifying the second data block by the second transaction, the processor 120 may display that the index structure change is being conducted by the second transaction on the second index node group which participates in the index structure change.

In order to prevent modification of the second data block by the transaction of the other instance after the exclusive modification authority of the second instance is set and it is verified that the first transaction is committed or rolled back, the second transaction accesses the second data block and modifies the second data block to perform the index structure change. The index structure change by the second transaction may be conducted similarly to the index structure change by the first transaction. Specifically, while the index structure change is performed by the second transaction, each index node of the second index node group which participates in the index structure change by the second transaction may display that the index structure change is being conducted by the second transaction. Then, other transactions (e.g., third transaction) may check whether there is the index node displaying that the index structure change is being conducted among index nodes to be accessed and modified before performing the index structure change. When the other transaction verifies the index node displaying that the index structure change is being conducted by the second transaction, the other transaction may request the transaction table to the second instance to which the second transaction conducting the index structure change belongs. In this case, another transaction checks whether the second transaction is committed or rolled back by referencing the transaction table to thereby wait for the index structure change or immediately initiate the index structure change. Other transactions after the second transaction may also perform the index structure change through the above-described process. Therefore, in order to prevent the integrity of the index structure from being broken in the process of managing the indexes for the plurality of instances, the change of the index structure may be performed 'atomically' for one transaction.

In the method for managing the index according to the present disclosure, when each transaction conducts the index structure change, the exclusive modification authority is secured by the unit of the instance for the index nodes (or data blocks) which participate in the index structure change. Specifically, since each instance has the instance memory area that manages the modification authority information, transmission/reception of data may not occur between the instances at the time of verifying the exclusive modification authority of the instance for the data block. Therefore, a phenomenon in which network and CPU resources are unnecessarily and excessively used, which occurs in the related art is prevented, and as a result, a problem in that load processing performance of the DB cluster deteriorates may be prevented. In the method of the present disclosure, resource waste which may occur as the number of instances constituting the DB cluster increases to increase scalability of the DB cluster.

FIGS. 3 to 10 illustrate an example embodiment of changing a structure of a B-tree index according to some example embodiments of the present disclosure.

Figure 3:
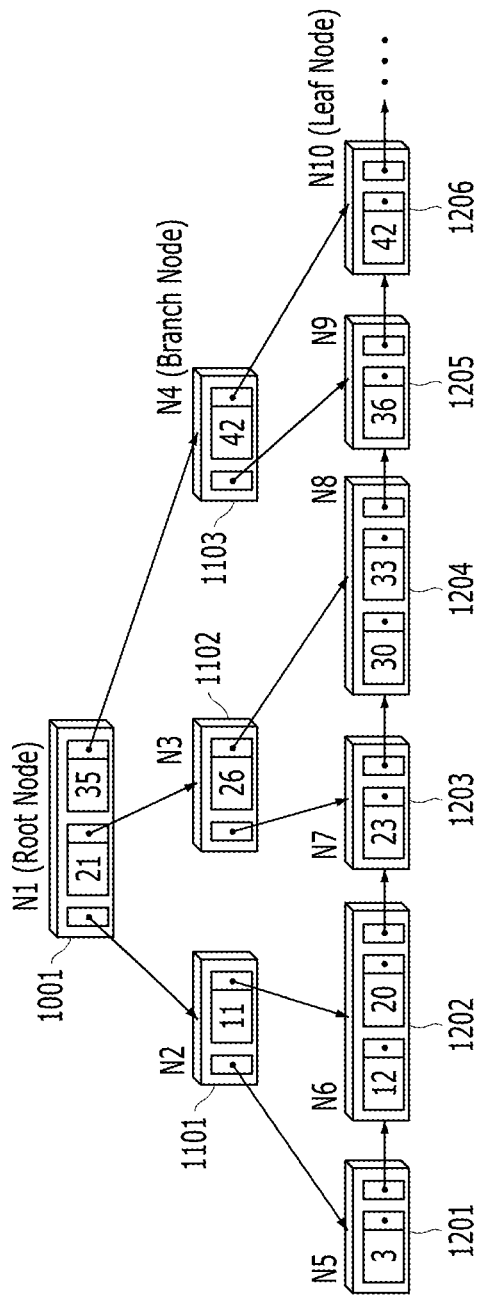
FIGS. 3 to 10 are diagrams for describing example operations of changing a structure of a B-tree index according to some example embodiments of the present disclosure.

FIG. 3 illustrates an example of the B-tree index. The B-tree index may be constituted by a root node 1001 positioned at a highest level, a plurality of leaf nodes 1201 to 1206 positioned at a lowest level, and a plurality of branch nodes 1101 to 1103 connecting the root node and the leaf nodes. The leaf nodes 1201 to 1206 positioned at the lowest level may store access information to the original data such as the address of the original data. The root node 1001 and the branch nodes 1101 to 1103 may serve as a mark for searching a target leaf node. Here, the target leaf node may be a leaf node into which a new index key is to be inserted or a leaf node including an index key to be deleted. All index keys may be aligned based on the index key value on the B-tree index. The target leaf node may be searched by comparing sizes of the index keys from the root node to the leaf node.

Figure 4:
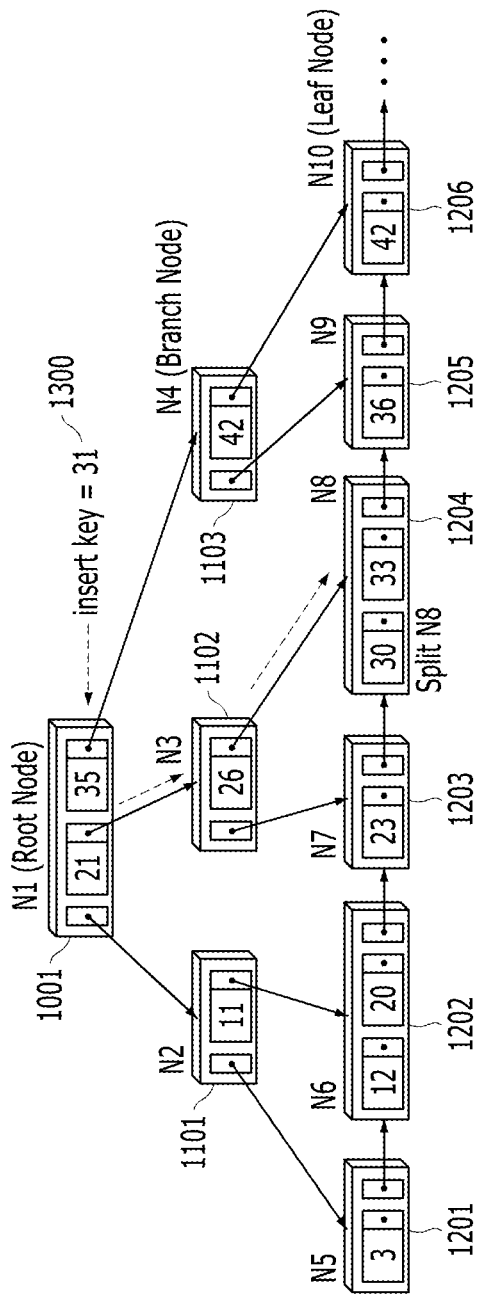

FIG. 4 is a diagram for describing an operation for describing an example embodiment of searching the target leaf node in order to insert a new index key 1300 called '31' in the B-tree index of FIG. 3. Referring to FIG. 4, the processor 120 may search the root node 1001 positioned at the highest level in order to insert the new index key 1300. In addition, the processor 120 compares the sizes of the index key stored in the root node 1001 and the new index key 1300 to determine one node to be searched next among the branch nodes 1101, 1102, and 1103. For example, when the new index key is smaller than '21', the target leaf node may be searched to branch node 'N2' 1101 along a left direction link in the root node 1001. As another example, when the new index key is larger than '21' and smaller than '35', the target leaf node may be searched to branch node 'N3' 1102 along an intermediate direction link in the root node 1001. As yet another example, when the new index key is larger than '35', the target leaf node may be searched to branch node 'N4' 1103 along a right direction link in the root node 1001.

Referring back to FIG. 4, since the new index key 1300 is '31', the target leaf node may be searched to branch node 'N3' 1102 along the intermediate direction link in the root node 1001. The sizes of the index keys in the branch nodes may be compared similarly according to the above-described scheme. Further, since the new index key 1300 is '31', the target leaf node may be searched to leaf node 'N8' 1204 along the right direction link in branch node 'N3' 1102. Consequently, the leaf node 'N8' 1204 may be determined as the target leaf node. The example embodiment of searching the target leaf node in order to insert the new index key is described, but an example embodiment of searching the target leaf node in order to delete the index key may also be performed in the same or similar scheme.

When there is no space into which the new index key may be inserted on the leaf node 'N8' 1204, a task of segmenting the node may be performed. The task of segmenting the node may mean an operation of additionally securing an available space on the index node through the index structure change.

Figure 5:
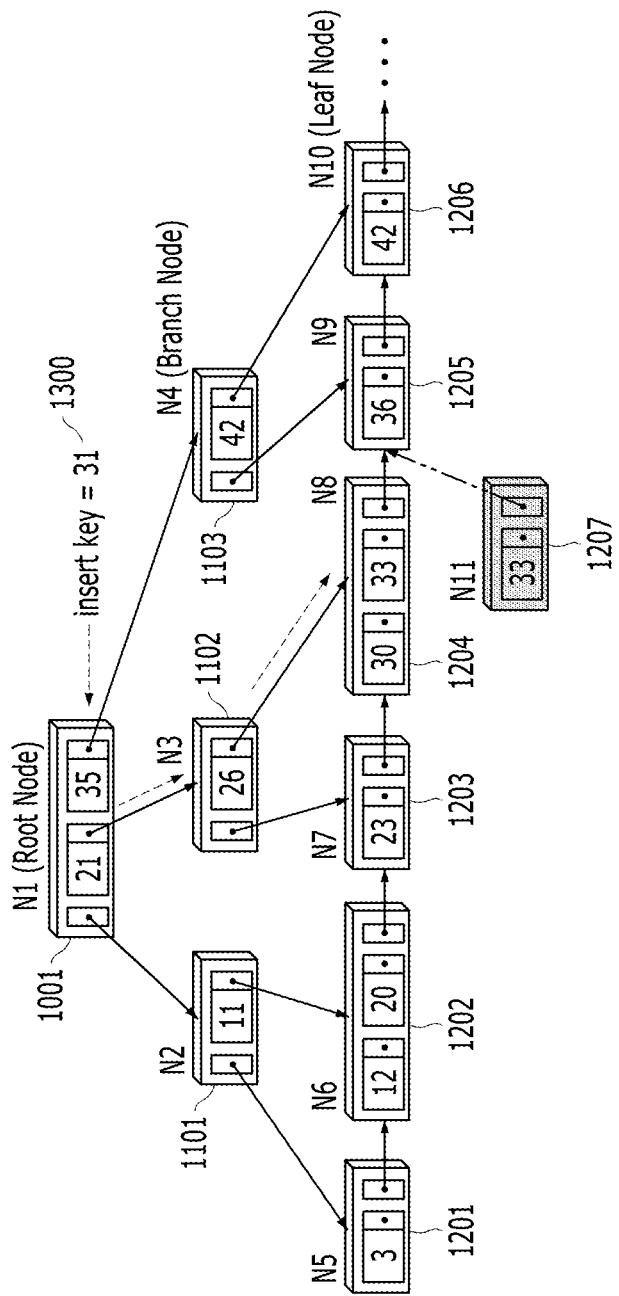
Figure 6:
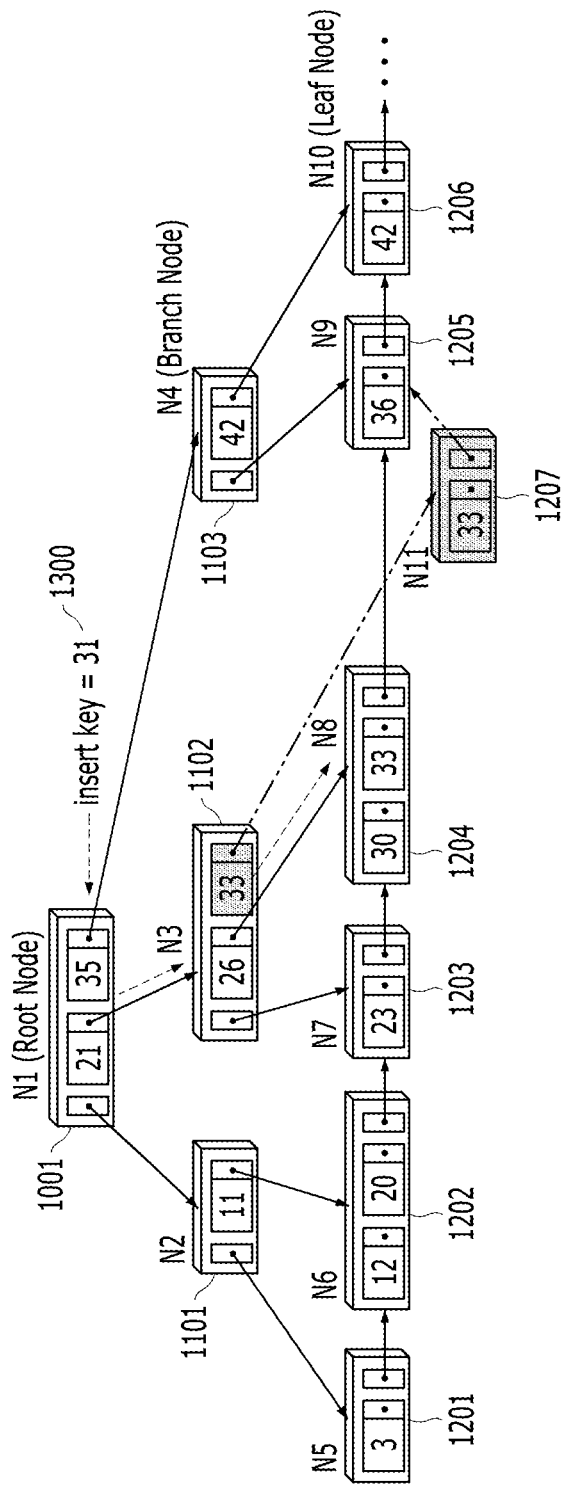
Figure 7:
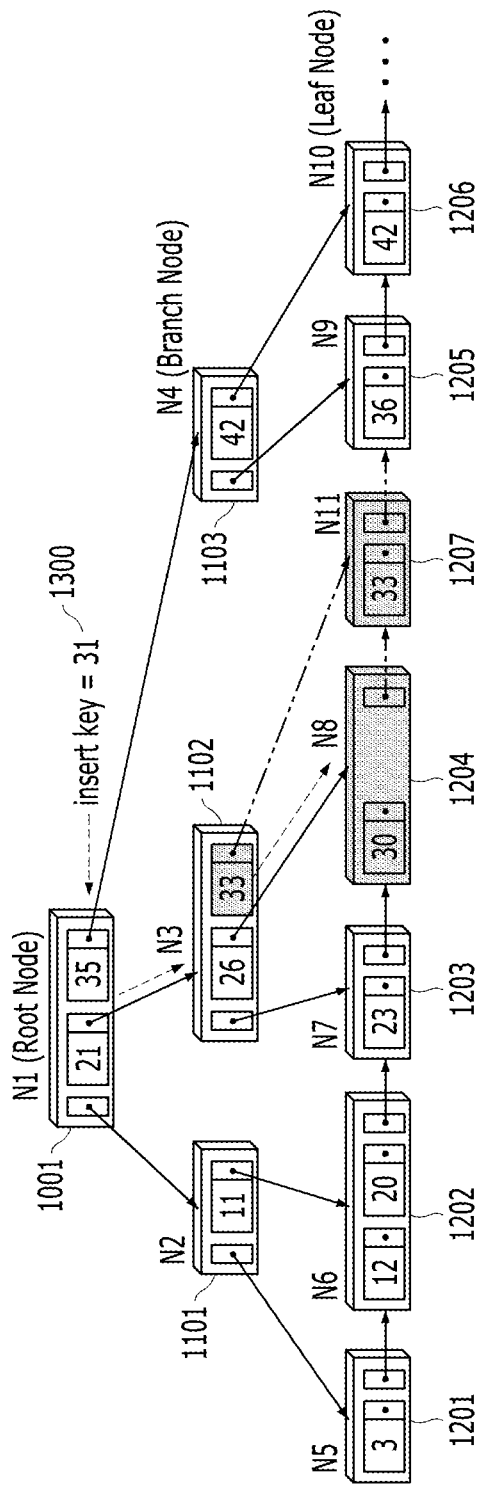

FIGS. 5 to 7 are diagrams for describing a series of operations of changing the structure of the B-tree index in order to secure the available space on the target leaf node.

Referring to FIG. 5, first, a new node 'N11' 1207 may be generated. In addition, an index key '33' stored in the target leaf node 'N8' 1204 may be copied to the new node 'N11' 1207. Referring to FIG. 6, the branch node 'N3' 1102 may be modified to have link information capable search of the node 'N11' 1007. Referring to FIG. 7, the index key '33' stored in the target leaf node 'N8' 1204 may be deleted. In addition, link information previously indicating a leaf node 'N9' 1205 in the target leaf node 'N8' 1204 may be modified to indicate the newly inserted leaf node 'N11' 1207. The series of operations of changing the structure of the B-tree index in order to secure the available space is just an example, and various schemes may be used.

Figure 8:
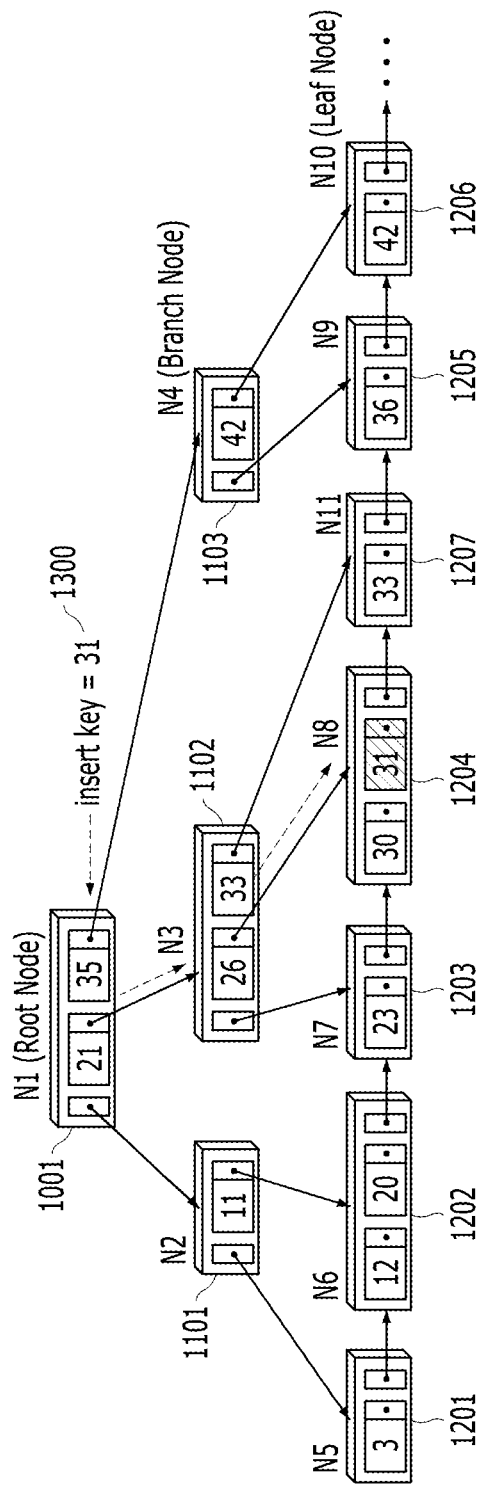

FIG. 8 illustrates an index in which the new index key '31' is inserted into the available space of the target leaf node 'N8' 1204 secured through the structure change of the index described in FIGS. 5 to 7.

Figure 9:
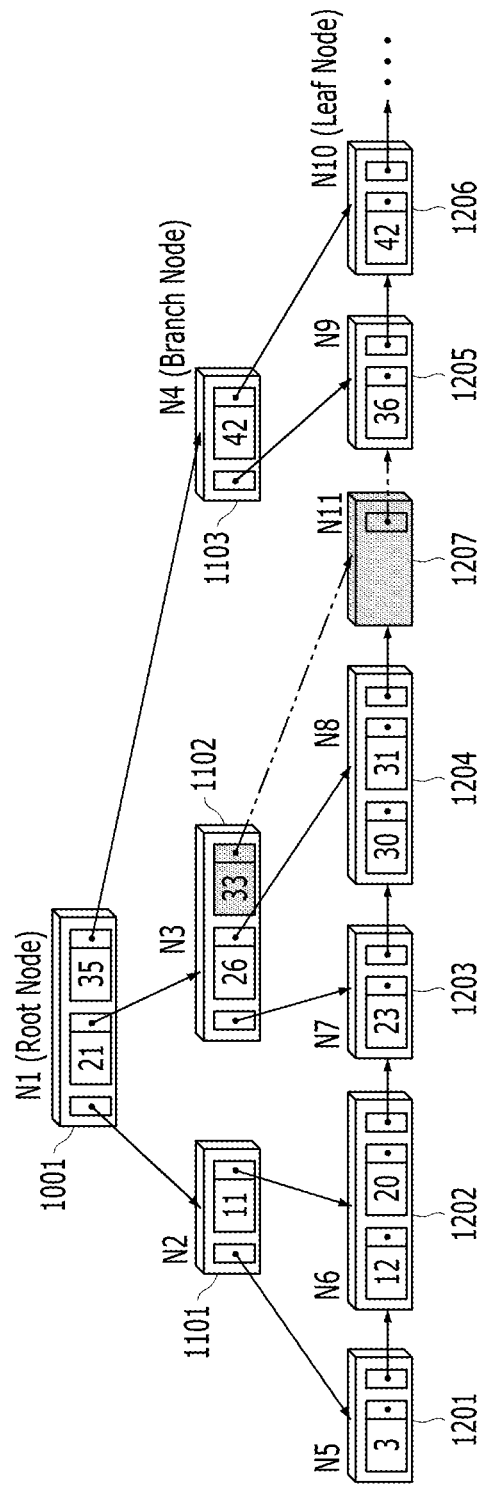
Figure 10:
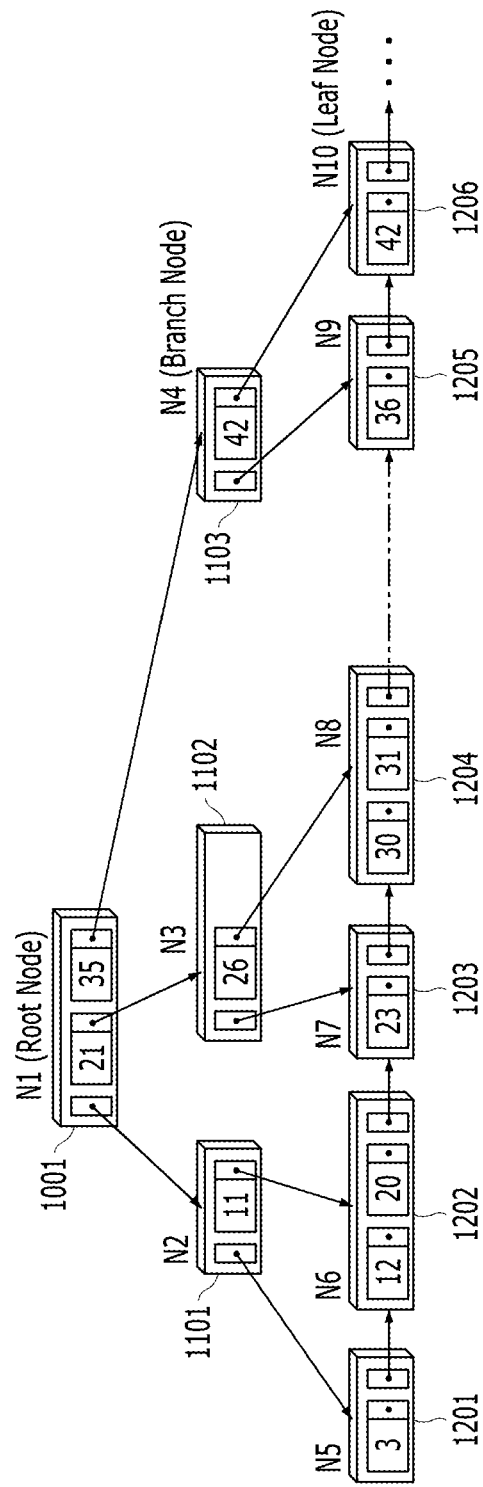

Referring to FIGS. 3 to 8, the operation of changing the structure of the B-tree index in order to additionally secure the available space is described, but an operation of changing the structure of the B-tree index in order to return the available space which is not used as illustrated in FIGS. 9 and 10 may also be performed.

Referring to FIG. 9, since the leaf node 'N11' 1207 does not include address information for any original data, a space occupied by the leaf node 'N11' 1207 may be returned in order to increase space use efficiency of the database and B-tree index search efficiency. Referring to FIG. 10, in order to return the space occupied by the leaf node 'N11' 1207, the link information indicating the leaf node 'N11' 1207 in the branch node 'N3' 1102 may be deleted. In addition, the link information indicating the leaf node 'N11' in the leaf node 'N8' 1204 may be modified to indicate the leaf node 'N9' 1205. The series of operations of changing the structure of the B-tree index in order to return the available space is just an example, and various schemes may be used.

In order to maintain the integrity of the B-tree index, the operation of changing the structure of the index in order to secure or return the available space may be atomically performed for one transaction. Atomicity which is a basic attribute of the transaction may guarantee all modification operations of a mode node which participates in the structure change of the index to be reflected onto the database or not to be reflected onto the database. Therefore, only some of the modification operations are reflected onto the database, and as a result, a problem in that the integrity of the index is damaged may be prevented. For example, in the example illustrated in FIGS. 5 to 7, when only some operations of a series of operations for the node 'N3' 1102, the node 'N8' 1204, and the node 'N11' 1207 are applied to the structure change of the index, an intact B-tree structure illustrated in FIG. 1 may not be established. Therefore, the transaction of modifying the index node for the index structure change generates information for displaying a node which is being modified, and as a result, the node which is being currently modified is simultaneously modified by the other instance to prevent the problem in that the integrity of the index is damaged.

Figures 11, 12:
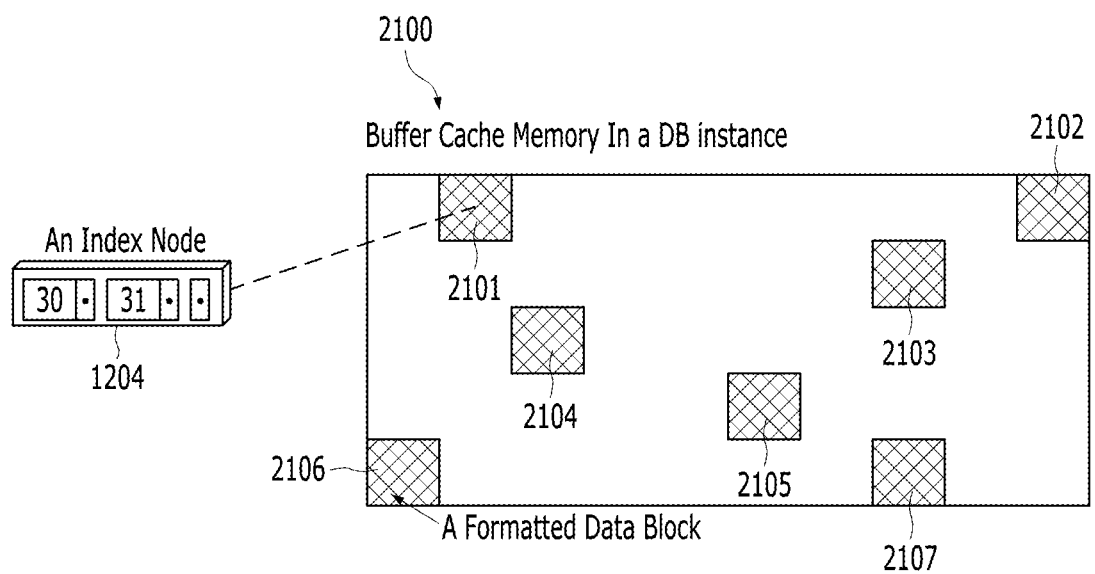
FIGS. 11 to 13 are diagrams for describing an index management method using a transaction table.
Figure 13:
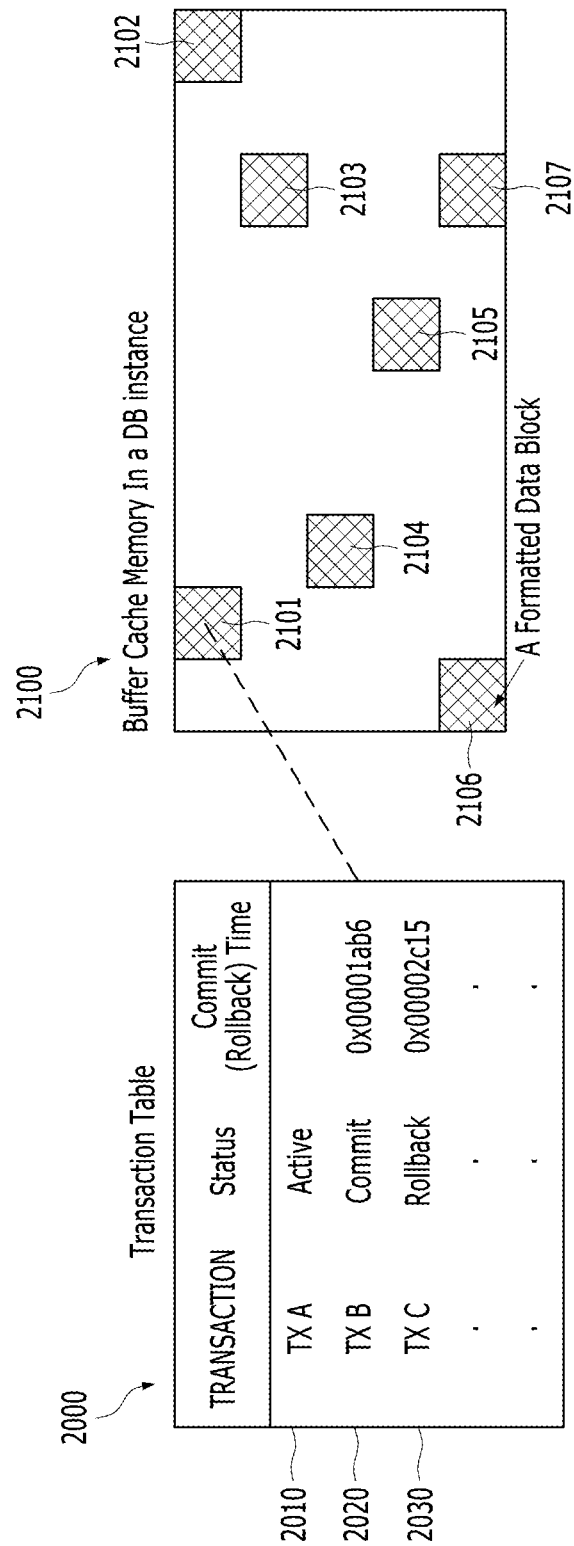

FIGS. 11 to 13 are diagrams for describing an index management method using a transaction table.

In the method for managing the index in the related art, the integrity of the index may be maintained by using the transaction table. The transaction table has information 2010 to 2030 on transactions which belong to one instance. Referring to FIG. 11, an example transaction table 2000 shows information on three transactions. In some examples, a transaction including a series of operations for the node 'N3' 1102, the node 'N8' 1204, and the node 'N11' 1207 described in FIGS. to 7 may be transaction B. In this case, the transaction of the other instance may check, through information marked in respective index nodes, whether there is a transaction which is performing the index structure change related to the nodes before trying to modify the node 'N3' 1102, the node 'N8' 1204, and the node 'N11' 1207. When verifying that there is the other transaction which is performing the index structure change related to the corresponding index node, the transaction may request a transaction table 2000 to the instance to which the transaction performing the index structure change belongs. Since the transaction table 2000 stores information 2020 indicating that transaction B is committed, the transaction of the other instance may immediately perform a task of modifying the node 'N3' 1102, the node 'N8' 1204, and the node 'N11' 1207 without waiting.

As another example, a transaction including a series of operations for the node 'N3' 1102, the node 'N8' 1204, and the node 'N11' 1207 may be transaction A. Even in this case, the transaction of the other instance may check, through the information marked in the index nodes, whether there is the other transaction which is performing the index structure change related to the nodes before trying to modify the node 'N3' 1102, the node 'N8' 1204, and the node 'N11' 1207. In addition, the transaction may request the transaction table 2000 to the instance to which the transaction performing the index structure change belongs. Since the transaction table 2000 stores information 2010 that transaction A is active, the transaction of the other instance should wait until transaction A is committed or rolled back.

In the active-active DB cluster environment, one DB cluster may constitute the plurality of instances. In addition, multiple transactions of the plurality of instances may simultaneously access the B-tree index in order to search and modify one B-tree index. Each of the plurality of instances may format target data in the form of one or more data blocks in order to reference or modify data. In addition, each instance may load the formatted data block on the buffer cache thereof. The data block loaded on the buffer cache may be used for performing the operation of each instance. Referring to FIG. 12, in some examples, the original data related to the index node 1204 may be loaded on a buffer cache 2100 of the DB instance in the form of a data block 2101. Therefore, referring to FIG. 13, the transactions 2010 to 2030 displayed in the transaction table 2000 may be related to one or more data blocks 2101 to 2107 used for processing the transaction, respectively.

For example, the active-active DB cluster may be constituted by instance '#0', instance '#1', and instance '#2', and the index structure change operation described in FIGS. 5 to 7 may be performed by transaction A of instance '#0'. In this case, the transaction of instance '#1' or instance '#2' identifies information marked in corresponding nodes before trying an access for modifying the node 'N3' 1102, the node 'N8' 1204, and the node 'N11' 1207 to verify that the structure change of the index by transaction A is being performed. Therefore, the transactions of instance '#1' or instance '#2' which intend to modify the corresponding nodes may request the transaction table 2000 to instance '#0' in order to check whether transaction A is committed or rolled back. Instance '#0' which receives a request for transmission of the transaction table 2000 may transmit the transaction table 2000 to instances (or transactions) which request the transaction table. Referring to FIG. 10, when the transaction of instance '#1' or instance '#2' which refers to the transaction table 2000 verifies that transaction A is 'active', the transaction of instance '#1' or instance '#2' should wait for a modification task for the corresponding nodes should wait until the state of transaction A is 'committed' or 'rolled back'. Further, when other transactions which intend to modify the corresponding index node occur again in instance '#1' or instance '#2' before the state of transaction A is 'committed' or 'rolled back', new transactions which occur should additionally transmit a request for the transaction table to the first instance in order to check whether transaction A is committed or rolled back again. By such a scheme, the request for the transaction table may unnecessarily occur several times.

In the process of conducting the index structure change by transaction A of instance '#0', a specific index node may be modified twice or more according to a structure change purpose and a structure change method. As such, when the specific index node is modified twice or more, there may be inefficiency that an index node (data block) is unnecessarily exchanged between instances. For example, it is assumed that after transaction A modifies the specific index node, the transaction of instance '#1' or instance '#2' requests and receives a corresponding data block to instance '#0' in order to modify the corresponding index node. In this case, transaction A of instance '#0' should request and receive the corresponding index node (data block) to instance '#1' or instance '#2' again at the time of modifying the corresponding index node again. That is, since the transaction of instance '#1' or instance '#2' requests and receives the corresponding index node to instance '#0' even though the transaction cannot modify an index node which participates in the index structure change, the transaction unnecessarily requests and receives the index node (data block) which is present in instance '#1' or instance '#2' at the time of remodifying the index node in instance '#0'.

In particular, when a situation in which multiple instances constituting the DB cluster simultaneously modify a specific index block frequently occurs (inter-instance hot block contention) or a task of a transaction of performing a change in index structure is lengthened (e.g., there are a lot of nodes which should be modified for changing the index structure), such an unnecessary task may repeatedly occur. In particular, due to structural characteristics of the B-tree index, all index keys are aligned based on a size of an index key value and inserted into the index node. Therefore, in a load environment in which a simultaneous modification task should be performed in the same or contiguous index key, index node contention between instances and the index structure change occur very frequently. In the load environment, a phenomenon in which network and CPU resources are unnecessarily and excessively used is more prominent, and as a result, a problem in that load processing performance of the DB cluster deteriorates is caused. Moreover, a degree of the resource waste becomes more severe as the number of instances constituting the DB cluster increases, which causes deterioration of scalability of the DB cluster.

According to some example embodiments of the present disclosure, as described above in FIG. 3, the processor 120 may group index nodes (or data blocks) that change the structure of the index when conducting the modification task for the B-tree index in the active-active database (DB) cluster environment. In addition, the processor 120 manages the modification authority for the grouped index nodes (and data blocks) for each instance, and as a result, unnecessary data transmission and CPU use may be reduced, which occur between the instances constituting the DB cluster. Specifically, since each instance has the instance memory area that manages the modification authority information, transmission/reception of data may not occur between the instances at the time of verifying the exclusive modification authority of the instance for the data block. Therefore, the index management method of the present disclosure may prevent a problem in that the transaction table is unnecessarily requested or the index node (data block) is unnecessarily requested and received between the instances.

FIGS. 14 to 18 are diagrams for describing a method for managing an index according to some example embodiments of the present disclosure.

Figure 14:
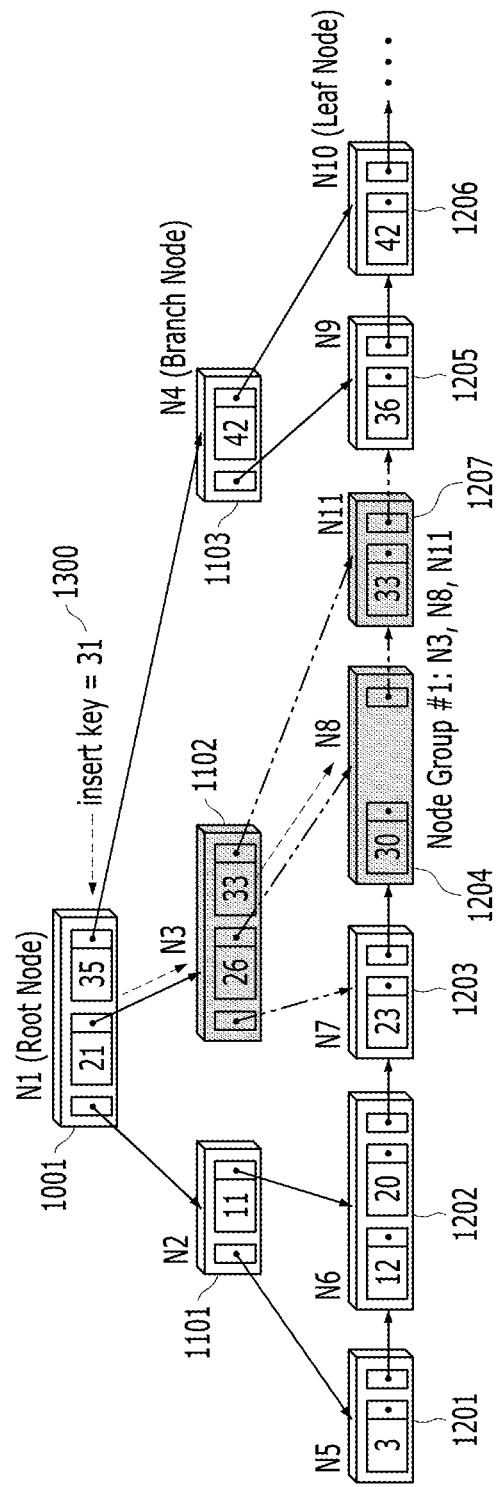
FIGS. 14 to 18 are diagrams for describing a method for managing an index according to some example embodiments of the present disclosure.
Figure 15:
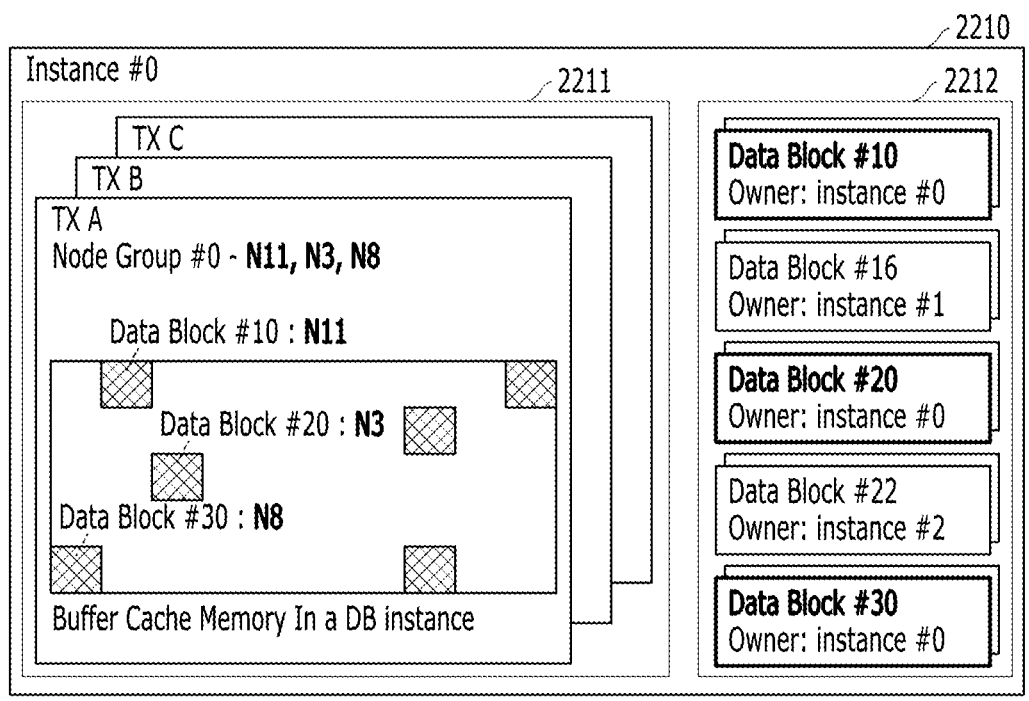

Similarly to the above-described example, it is assumed that the active-active DB cluster is constituted by instance '#0', instance '#1', and instance '#2', and the index structure change operation described in FIGS. 5 to 7 is performed by transaction A of instance '#0'. Referring to FIG. 14, the node 'N3' 1102, the node 'N8' 1204, and the node 'N11' 1207 which participate in the structure change of the index by transaction A may be grouped. FIG. 15 illustrates that instance '#0' 2210 obtains the exclusive modification authority for data blocks '#10', '#20', and '#30' corresponding to the node 'N3' 1102, the node 'N8' 1204, and the node 'N11' 1207 which are grouped. In this case, instance '#0' may be the first instance and the first data block may be data blocks '#10', '#20', and '#30'.

Since transaction A of instance '#0' 2210 conducts the modification task in the order of the node 'N3' 1102, the node 'N8' 1204, and the node 'N11' 1207, instance '#0' 2210 may obtain the exclusive modification authority in the order of data blocks '#10', '#20', and '#30'. In this case, information on the exclusive modification authority of instance '#0' may be stored in an instance memory area 2212 of instance '#0' 2210. Here, the information that instance '#0' obtains the exclusive modification authority for data blocks '#10', '#20', and '#30' may be referred to as the first modification authority information. The first modification authority information that instance '#0' obtains the exclusive modification authority for data blocks '#10', '#20', and '#30' may be shared by other instance constituting the DB cluster so as to be referenced by the transactions of other instances.

Figure 16:
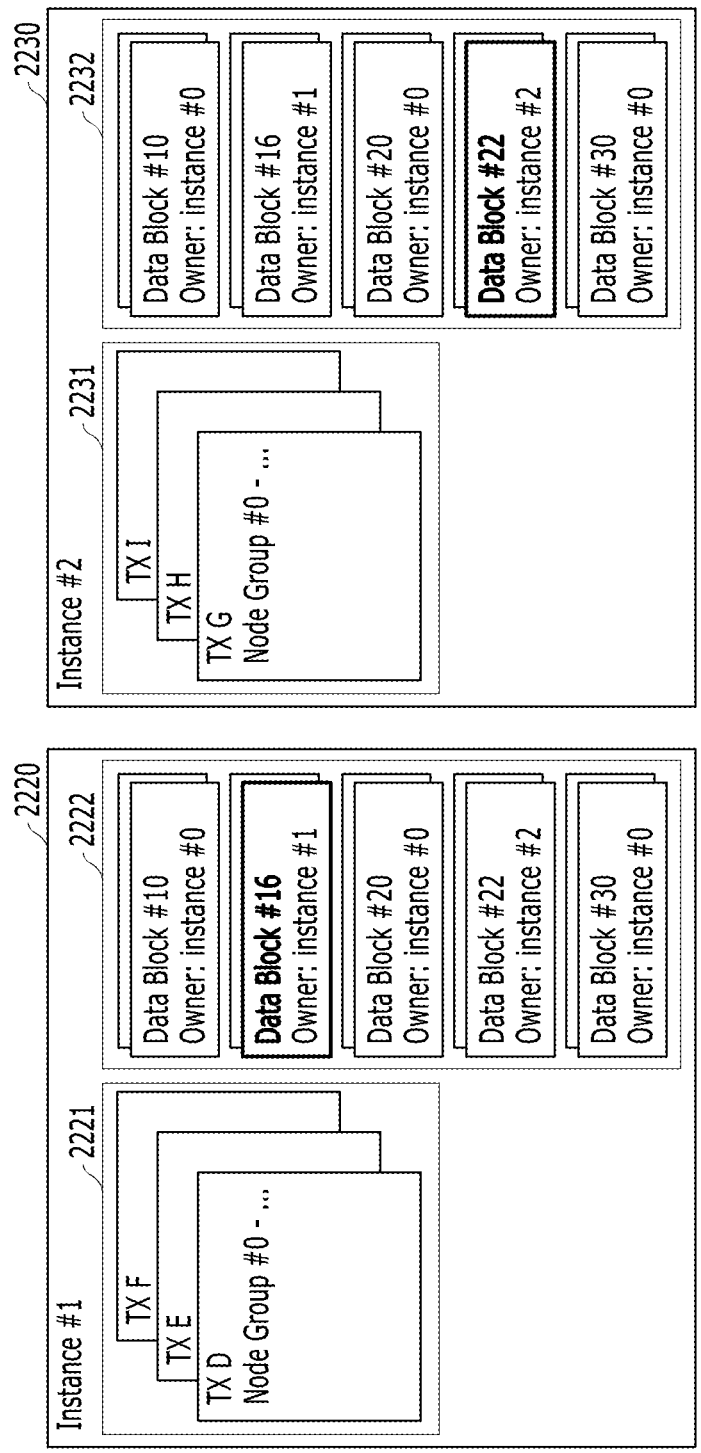

Referring to FIG. 16, the first modification authority information representing the exclusive modification authority of instance '#0' may be stored in an instance memory area 2222 of instance '#1' 2220 and an instance memory area 2232 of instance '#2' 2230. From this viewpoint, the first instance may be instance '#0' 2210 and the second instance '#1' 2220 or instance '#2' 2230. Referring back to FIG. 15, information representing the exclusive modification authority of instance '#1' 2220 and information representing the exclusive modification authority of instance '#2' 2230 may be stored in the instance memory area 2212 of instance '#0' 2210. From this viewpoint, the first instance may be instance '#1' 2220 or instance '#2' 2230, and the second instance may be instance '#0' 2210.

In such a state, when the transactions 2221 of instance '#1' 2220 trying to access data blocks '#10', '#20', and '#30' in order to modify data blocks '#10', '#20', and '#30', the transactions 2221 of instance '#1' 2220 may reference the modification authority information stored in the instance memory area 2222 of instance '#1' 2220. In this case, the transaction of instance '#1' 2220 may verify that there is a data block in which the exclusive modification authority of instance '#0' 2210 is set among data blocks to be modified by the transactions 2221 of instance '#1' 2220. In this case, instance '#1' 2220 may be the second instance and the data block to be modified by the transactions 2221 of instance '#1' 2220 may be the second data block. In addition, a data block in which the exclusive modification authority of instance '#0' 2210 is set among the data blocks to be modified by the transactions 2221 of instance '#1' 2220 may be the first group. In this case, the access of instance '#1' 2220 for modifying data blocks '#10', '#20', and '#30' may be restricted (waited) until transaction A is committed or rolled back.

Figure 17:
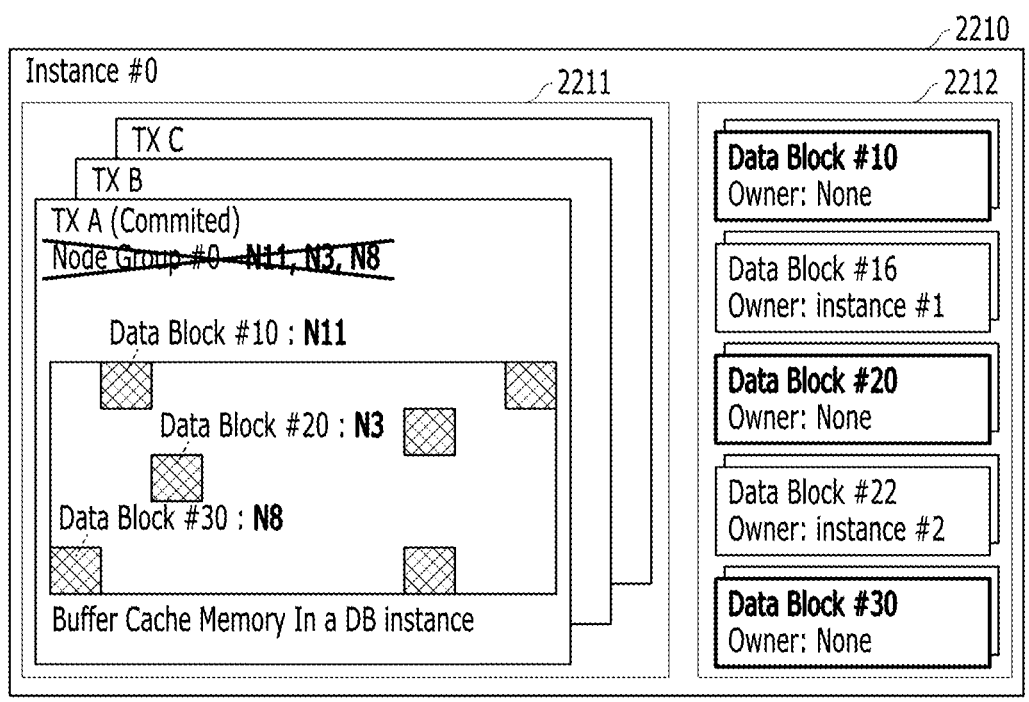
Figure 18:
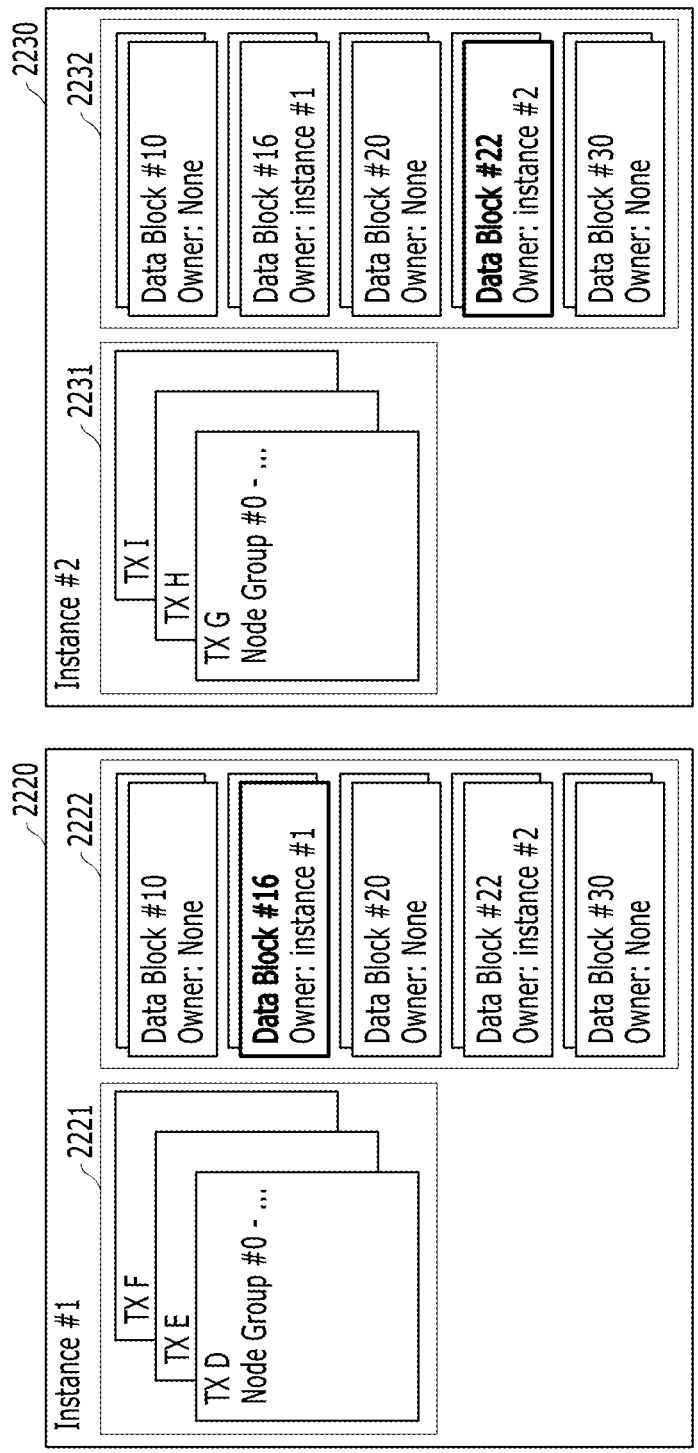

Referring to FIG. 17, since transaction A is committed, the first modification authority information may be cancelled on the instance memory area 2212 of instance '#0' 2210 in order to cancel the exclusive modification authority of instance '#0' 2210 for data blocks '#10', '#20', and '#30'. Similarly to the first modification authority information, the second modification authority information for announcing that the exclusive modification authority of instance '#0' 2210 is cancelled may be shared by other instances constituting the DB cluster. Referring to FIG. 18, the second modification authority information is transmitted to the instance memory area 2222 of instance '#1' 2220 and the instance memory area 2232 of instance '#2' 2230 to cancel the first modification authority information representing the exclusive modification authority of instance '#0' 2210 for data blocks '#10', '#20', and '#30' stored previously (see FIG. 16). For example, it is represented that there is no instance having the exclusive modification authority for data blocks '#10', '#20', and '#30' to cancel the first modification authority information. In this case, each instance may obtain the exclusive modification authority for the data block in which the exclusive modification authority of instance '#0' 2210 is cancelled.

Figure 19:
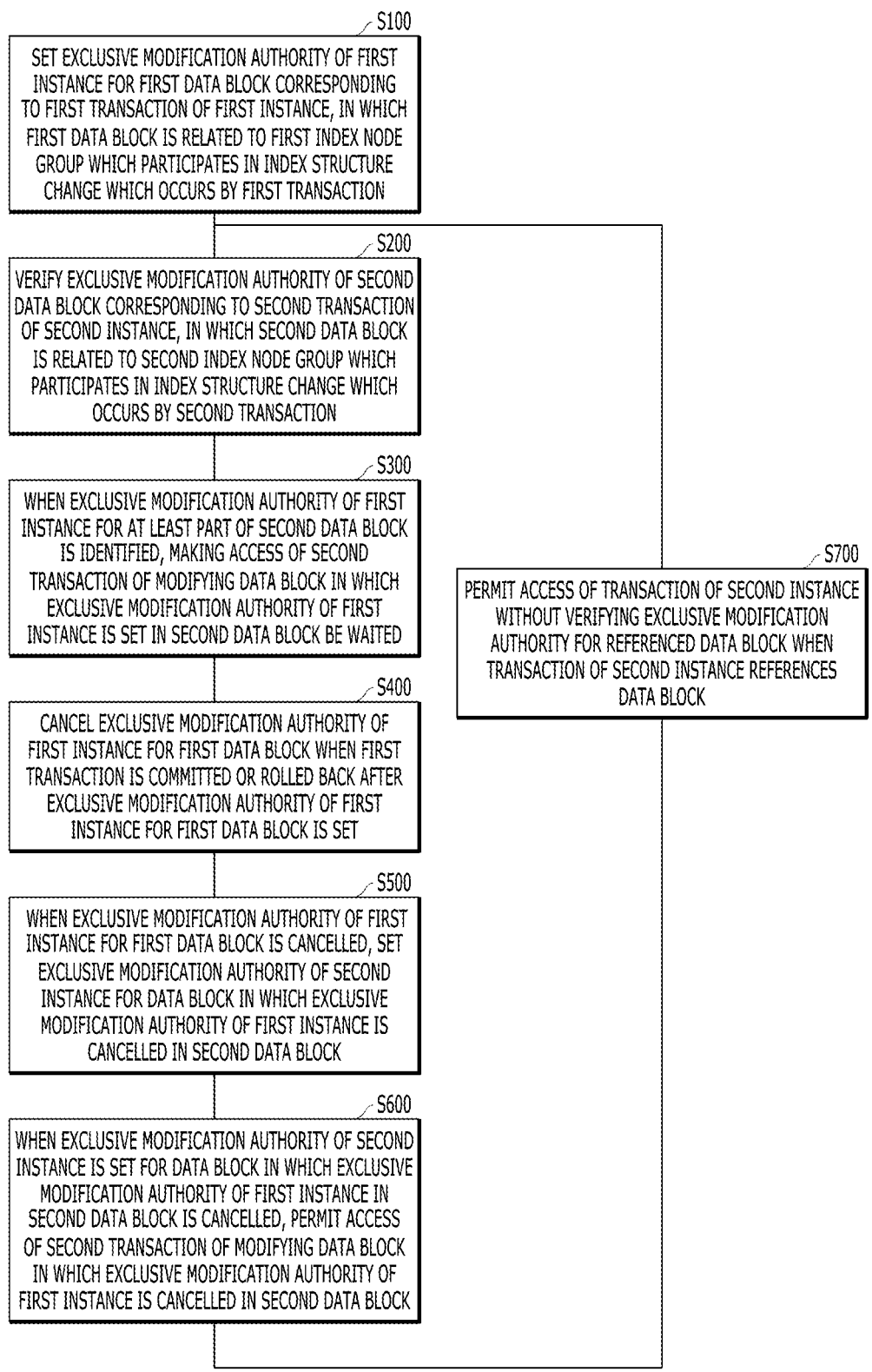
FIG. 19 is a flowchart of a method for managing an index according to some example embodiments of the present disclosure.

FIG. 19 is a flowchart of a method for managing an index according to some example embodiments of the present disclosure.

According to some example embodiments of the present disclosure, the method for managing the index according to the present disclosure may include setting an exclusive modification authority of a first instance for a first data block corresponding to a first transaction of the first instance (s100). Here, the first data block may be related to a first index node group which participates in the index structure change which occurs by the first transaction.

According to some example embodiments of the present disclosure, the method for managing the index according to the present disclosure may include verifying an exclusive modification authority for a second data block corresponding to a second transaction of the second instance (s200). Here, the second data block may be related to a second index node group which participates in the index structure change which occurs by the second transaction.

According to some example embodiments of the present disclosure, the method for managing the index according to the present disclosure may make the access of the second transaction of modifying the data block in which the exclusive modification authority of the first instance is set in the second data block be waited when the exclusive modification authority of the first instance for at least a part of the second data block is identified (s300).

According to some example embodiments of the present disclosure, the method for managing the index according to the present disclosure may cancel the exclusive modification authority of the first instance for the first data block when the first transaction is committed or rolled back after the exclusive modification authority of the first instance for the first data block is set (s400).

According to some example embodiments of the present disclosure, the method for managing the index according to the present disclosure may setting the exclusive modification authority of the second instance for the data block in which the exclusive modification authority of the first instance is cancelled in the second data block when which the exclusive modification authority of the first instance for the first data block is cancelled (s500).

According to some example embodiments of the present disclosure, the method for managing the index according to the present disclosure may permit the access of the second transaction of modifying the data block in which the exclusive modification authority of the first instance is cancelled in the second data block when which the exclusive modification authority of the second instance is set for the data block in which the exclusive modification authority of the first instance is cancelled in the second data block (s600).

According to some example embodiments of the present disclosure, the method for managing the index according to the present disclosure may permit the access of the transaction of the second instance without verifying the exclusive modification authority for the referenced data block when the transaction of the second instance references the data block (s700).

The steps of the method for managing the index are presented just for the description, and some step may be omitted or separate steps may be added. Further, the steps of the method for managing the index may be performed according to a predetermined order.

Figure 20:
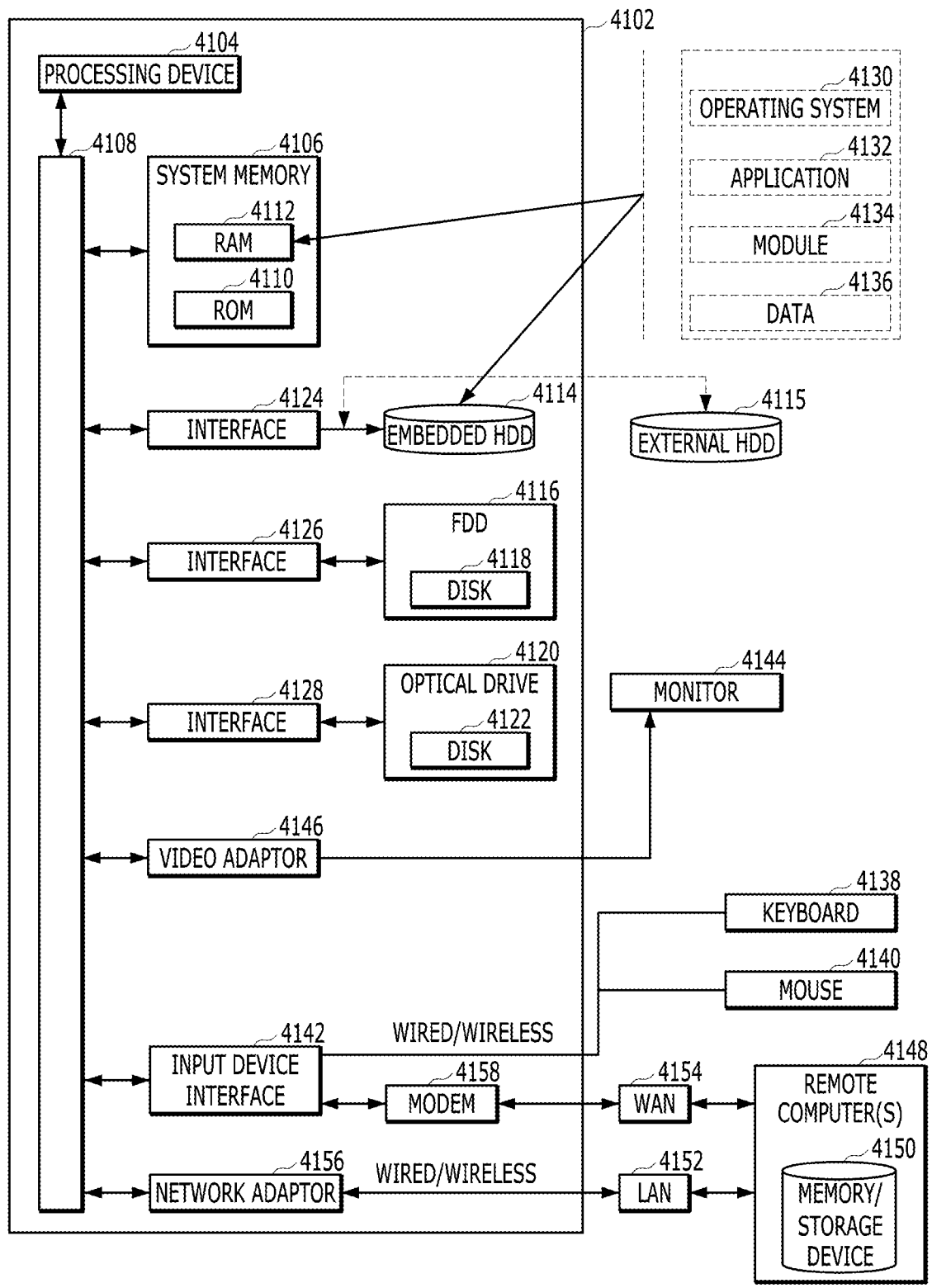
FIG. 20 is a schematic view of an example computing environment in which embodiments of the present disclosure may be implemented.

FIG. 20 is a general schematic diagram illustrating an example of a computing environment in which the example embodiments of the present disclosure contents are implementable.

The present disclosure has been described as being generally implementable by the computing device, but those skilled in the art will appreciate well that the present disclosure is combined with computer executable commands and/or other program modules executable in one or more computers and/or be implemented by a combination of hardware and software.

In general, a program module includes a routine, a program, a component, a data structure, and the like performing a specific task or implementing a specific abstract data form. Further, those skilled in the art will appreciate well that the method of the present disclosure may be carried out by a personal computer, a hand-held computing device, a microprocessor-based or programmable home appliance (each of which may be connected with one or more relevant devices and be operated), and other computer system configurations, as well as a single-processor or multiprocessor computer system, a mini computer, and a main frame computer.

The example embodiments of the present disclosure may be carried out in a distribution computing environment, in which certain tasks are performed by remote processing devices connected through a communication network. In the distribution computing environment, a program module may be located in both a local memory storage device and a remote memory storage device.

The computer generally includes various computer readable media. The computer accessible medium may be any type of computer readable medium, and the computer readable medium includes volatile and non-volatile media, transitory and non-transitory media, and portable and non-portable media. As a non-limited example, the computer readable medium may include a computer readable storage medium and a computer readable transmission medium. The computer readable storage medium includes volatile and non-volatile media, transitory and non-transitory media, and portable and non-portable media constructed by a predetermined method or technology, which stores information, such as a computer readable command, a data structure, a program module, or other data. The computer readable storage medium includes a RAM, a Read Only Memory (ROM), an Electrically Erasable and Programmable ROM (EEPROM), a flash memory, or other memory technologies, a Compact Disc (CD)-ROM, a Digital Video Disk (DVD), or other optical disk storage devices, a magnetic cassette, a magnetic tape, a magnetic disk storage device, or other magnetic storage device, or other predetermined media, which are accessible by a computer and are used for storing desired information, but is not limited thereto.

The computer readable transport medium generally implements a computer readable command, a data structure, a program module, or other data in a modulated data signal, such as a carrier wave or other transport mechanisms, and includes all of the information transport media. The modulated data signal means a signal, of which one or more of the characteristics are set or changed so as to encode information within the signal. As a non-limited example, the computer readable transport medium includes a wired medium, such as a wired network or a direct-wired connection, and a wireless medium, such as sound, Radio Frequency (RF), infrared rays, and other wireless media. A combination of the predetermined media among the foregoing media is also included in a range of the computer readable transport medium.

An illustrative environment 4100 including a computer 4102 and implementing several aspects of the present disclosure is illustrated, and the computer 4102 includes a processing device 4104, a system memory 4106, and a system bus 4108. The system bus 4108 connects system components including the system memory 4106 (not limited) to the processing device 4104. The processing device 4104 may be a predetermined processor among various commonly used processors. A dual processor and other multi-processor architectures may also be used as the processing device 4104.

The system bus 4108 may be a predetermined one among several types of bus structure, which may be additionally connectable to a local bus using a predetermined one among a memory bus, a peripheral device bus, and various common bus architectures. The system memory 4106 includes a ROM 4110, and a RAM 4112. A basic input/output system (BIOS) is stored in a non-volatile memory 4110, such as a ROM, an erasable and programmable ROM (EPROM), and an EEPROM, and the BIOS includes a basic routine helping a transport of information among the constituent elements within the computer 4102 at a time, such as starting. The RAM 4112 may also include a high-rate RAM, such as a static RAM, for caching data.

The computer 4102 also includes an embedded hard disk drive (HDD) 4114 (for example, enhanced integrated drive electronics (EIDE) and serial advanced technology attachment (SATA))—the embedded HDD 4114 being configured for exterior mounted usage within a proper chassis (not illustrated)—a magnetic floppy disk drive (FDD) 4116 (for example, which is for reading data from a portable diskette 4118 or recording data in the portable diskette 4118), and an optical disk drive 4120 (for example, which is for reading a CD-ROM disk 4122, or reading data from other high-capacity optical media, such as a DVD, or recording data in the high-capacity optical media). A hard disk drive 4114, a magnetic disk drive 4116, and an optical disk drive 4120 may be connected to a system bus 4108 by a hard disk drive interface 4124, a magnetic disk drive interface 4126, and an optical drive interface 4128, respectively. An interface 4124 for implementing an exterior mounted drive includes, for example, at least one of or both a universal serial bus (USB) and the Institute of Electrical and Electronics Engineers (IEEE) 1394 interface technology.

The drives and the computer readable media associated with the drives provide non-volatile storage of data, data structures, computer executable commands, and the like. In the case of the computer 4102, the drive and the medium correspond to the storage of random data in an appropriate digital form. In the description of the computer readable media, the HDD, the portable magnetic disk, and the portable optical media, such as a CD, or a DVD, are mentioned, but those skilled in the art will well appreciate that other types of computer readable media, such as a zip drive, a magnetic cassette, a flash memory card, and a cartridge, may also be used in the illustrative operation environment, and the predetermined medium may include computer executable commands for performing the methods of the present disclosure.

A plurality of program modules including an operation system 4130, one or more application programs 4132, other program modules 4134, and program data 4136 may be stored in the drive and the RAM 4112. An entirety or a part of the operation system, the application, the module, and/or data may also be cached in the RAM 4112. It will be well appreciated that the present disclosure may be implemented by several commercially usable operation systems or a combination of operation systems.

A user may input a command and information to the computer 4102 through one or more wired/wireless input devices, for example, a keyboard 4138 and a pointing device, such as a mouse 4140. Other input devices (not illustrated) may be a microphone, an IR remote controller, a joystick, a game pad, a stylus pen, a touch screen, and the like. The foregoing and other input devices are frequently connected to the processing device 4104 through an input device interface 4142 connected to the system bus 4108, but may be connected by other interfaces, such as a parallel port, an IEEE 1394 serial port, a game port, a USB port, an IR interface, and other interfaces. A monitor 4144 or other types of display devices are also connected to the system bus 4108 through an interface, such as a video adaptor 4146. In addition to the monitor 4144, the computer generally includes other peripheral output devices (not illustrated), such as a speaker and a printer.

The computer 4102 may be operated in a networked environment by using a logical connection to one or more remote computers, such as remote computer(s) 4148, through wired and/or wireless communication. The remote computer(s) 4148 may be a work station, a computing device computer, a router, a personal computer, a portable computer, a microprocessor-based entertainment device, a peer device, and other general network nodes, and generally includes some or an entirety of the constituent elements described for the computer 4102, but only a memory storage device 4150 is illustrated for simplicity. The illustrated logical connection includes a wired/wireless connection to a local area network (LAN) 4152 and/or a larger network, for example, a wide area network (WAN) 4154. The LAN and WAN networking environments are general in an office and a company, and make an enterprise-wide computer network, such as an Intranet, easy, and all of the LAN and WAN networking environments may be connected to a worldwide computer network, for example, the Internet.

When the computer 4102 is used in the LAN networking environment, the computer 4102 is connected to the local network 4152 through a wired and/or wireless communication network interface or an adaptor 4156. The adaptor 4156 may make wired or wireless communication to the LAN 4152 easy, and the LAN 4152 also includes a wireless access point installed therein for the communication with the wireless adaptor 4156. When the computer 4102 is used in the WAN networking environment, the computer 4102 may include a modem 4158, is connected to a communication computing device on a WAN 4154, or includes other means setting communication through the WAN 4154 via the Internet. The modem 4158, which may be an embedded or outer-mounted and wired or wireless device, is connected to the system bus 4108 through a serial port interface 4142. In the networked environment, the program modules described for the computer 4102 or some of the program modules may be stored in a remote memory/storage device 4150. The illustrated network connection is illustrative, and those skilled in the art will appreciate well that other means setting a communication link between the computers may be used.

The computer 4102 performs an operation of communicating with a predetermined wireless device or entity, for example, a printer, a scanner, a desktop and/or portable computer, a portable data assistant (PDA), a communication satellite, predetermined equipment or place related to a wirelessly detectable tag, and a telephone, which is disposed by wireless communication and is operated. The operation includes a wireless fidelity (Wi-Fi) and Bluetooth wireless technology at least. Accordingly, the communication may have a pre-defined structure, such as a network in the related art, or may be simply ad hoc communication between at least two devices.

The Wi-Fi enables a connection to the Internet and the like even without a wire. The Wi-Fi is a wireless technology, such as a cellular phone, which enables the device, for example, the computer, to transmit and receive data indoors and outdoors, that is, in any place within a communication range of a base station. A Wi-Fi network uses a wireless technology, which is called IEEE 802.11 (a, b, g, etc.) for providing a safe, reliable, and high-rate wireless connection. The Wi-Fi may be used for connecting the computer to the computer, the Internet, and the wired network (IEEE 802.3 or Ethernet is used). The Wi-Fi network may be operated at, for example, a data rate of 11 Mbps (802.11a) or 54 Mbps (802.11b) in an unauthorized 2.4 and 5 GHz wireless band, or may be operated in a product including both bands (dual bands).

Those skilled in the art may appreciate that information and signals may be expressed by using predetermined various different technologies and techniques. For example, data, indications, commands, information, signals, bits, symbols, and chips referable in the foregoing description may be expressed with voltages, currents, electromagnetic waves, magnetic fields or particles, optical fields or particles, or a predetermined combination thereof.

In the meantime, according to an example embodiment of the present disclosure, a computer readable medium storing a data structure is disclosed.

The data structure may refer to organization, management, and storage of data that enable efficient access and modification of data. The data structure may refer to organization of data for solving a specific problem (for example, data search, data storage, and data modification in the shortest time). The data structure may also be defined with a physical or logical relationship between the data elements designed to support a specific data processing function. A logical relationship between data elements may include a connection relationship between user defined data elements. A physical relationship between data elements may include an actual relationship between the data elements physically stored in a computer readable storage medium (for example, a permanent storage device). In particular, the data structure may include a set of data, a relationship between data, and a function or a command applicable to data. Through the effectively designed data structure, the computing device may perform a calculation while minimally using resources of the computing device. In particular, the computing device may improve efficiency of calculation, reading, insertion, deletion, comparison, exchange, and search through the effectively designed data structure.

The data structure may be divided into a linear data structure and a non-linear data structure according to the form of the data structure. The linear data structure may be the structure in which only one data is connected after one data. The linear data structure may include a list, a stack, a queue, and a dequeue. The list may mean a series of dataset in which order exists internally. The list may include a linked list. The linked list may have a data structure in which data is connected in a method in which each data has a pointer and is linked in a single line. In the linked list, the pointer may include information about the connection with the next or previous data. The linked list may be expressed as a single linked list, a double linked list, and a circular linked list according to the form. The stack may have a data listing structure with limited access to data. The stack may have a linear data structure that may process (for example, insert or delete) data only at one end of the data structure. The data stored in the stack may have a data structure (Last In First Out, LIFO) in which the later the data enters, the sooner the data comes out. The queue is a data listing structure with limited access to data, and may have a data structure (First In First Out, FIFO) in which the later the data is stored, the later the data comes out, unlike the stack. The dequeue may have a data structure that may process data at both ends of the data structure.

The non-linear data structure may be the structure in which the plurality of pieces of data is connected after one data. The non-linear data structure may include a graph data structure. The graph data structure may be defined with a vertex and an edge, and the edge may include a line connecting two different vertexes. The graph data structure may include a tree data structure. The tree data structure may be the data structure in which a path connecting two different vertexes among the plurality of vertexes included in the tree is one. That is, the tree data structure may be the data structure in which a loop is not formed in the graph data structure.

Throughout the present specification, a calculation model, a nerve network, the network function, and the neural network may be used with the same meaning. Hereinafter, the terms of the calculation model, the nerve network, the network function, and the neural network are unified and described with a neural network. The data structure may include a neural network. Further, the data structure including the neural network may be stored in a computer readable medium. The data structure including the neural network may also include data pre-processed by the processing by the neural network, data input to the neural network, a weight of the neural network, a hyper-parameter of the neural network, data obtained from the neural network, an active function associated with each node or layer of the neural network, and a loss function for training of the neural network. The data structure including the neural network may include predetermined configuration elements among the disclosed configurations. That is, the data structure including the neural network may also include all or a predetermined combination of preprocessed data for processing by the neural network, data input to the neural network, a weight of the neural network, a hyper-parameter of the neural network, data obtained from the neural network, an active function associated with each node or layer of the neural network, and a loss function for training of the neural network. In addition to the foregoing configurations, the data structure including the neural network may include predetermined other information determining a characteristic of the neural network. Further, the data structure may include all type of data used or generated in a computation process of the neural network, and is not limited to the foregoing matter. The computer readable medium may include a computer readable recording medium and/or a computer readable transmission medium. The neural network may be formed of a set of interconnected calculation units which are generally referred to as "nodes". The "nodes" may also be called "neurons". The neural network consists of one or more nodes.

The data structure may include data input to the neural network. The data structure including the data input to the neural network may be stored in the computer readable medium. The data input to the neural network may include training data input in the training process of the neural network and/or input data input to the training completed neural network. The data input to the neural network may include data that has undergone pre-processing and/or data to be pre-processed. The pre-processing may include a data processing process for inputting data to the neural network. Accordingly, the data structure may include data to be pre-processed and data generated by the pre-processing. The foregoing data structure is merely an example, and the present disclosure is not limited thereto.

The data structure may include a weight of the neural network. (in the present specification, weights and parameters may be used with the same meaning.) Further, the data structure including the weight of the neural network may be stored in the computer readable medium. The neural network may include a plurality of weights. The weight is variable, and in order for the neural network to perform a desired function, the weight may be varied by a user or an algorithm. For example, when one or more input nodes are connected to one output node by links, respectively, the output node may determine a data value output from the output node based on values input to the input nodes connected to the output node and the weight set in the link corresponding to each of the input nodes. The foregoing data structure is merely an example, and the present disclosure is not limited thereto.

For a non-limited example, the weight may include a weight varied in the neural network training process and/or the weight when the training of the neural network is completed. The weight varied in the neural network training process may include a weight at a time at which a training cycle starts and/or a weight varied during a training cycle. The weight when the training of the neural network is completed may include a weight of the neural network completing the training cycle. Accordingly, the data structure including the weight of the neural network may include the data structure including the weight varied in the neural network training process and/or the weight when the training of the neural network is completed. Accordingly, it is assumed that the weight and/or a combination of the respective weights are included in the data structure including the weight of the neural network. The foregoing data structure is merely an example, and the present disclosure is not limited thereto.

The data structure including the weight of the neural network may be stored in the computer readable storage medium (for example, a memory and a hard disk) after undergoing a serialization process. The serialization may be the process of storing the data structure in the same or different computing devices and converting the data structure into a form that may be reconstructed and used later. The computing device may serialize the data structure and transceive the data through a network. The serialized data structure including the weight of the neural network may be reconstructed in the same or different computing devices through deserialization. The data structure including the weight of the neural network is not limited to the serialization. Further, the data structure including the weight of the neural network may include a data structure (for example, in the non-linear data structure, B-Tree, Trie, m-way search tree, AVL tree, and Red-Black Tree) for improving efficiency of the calculation while minimally using the resources of the computing device. The foregoing matter is merely an example, and the present disclosure is not limited thereto.

The data structure may include a hyper-parameter of the neural network. The data structure including the hyper-parameter of the neural network may be stored in the computer readable medium. The hyper-parameter may be a variable varied by a user. The hyper-parameter may include, for example, a learning rate, a cost function, the number of times of repetition of the training cycle, weight initialization (for example, setting of a range of a weight value to be weight-initialized), and the number of hidden units (for example, the number of hidden layers and the number of nodes of the hidden layer). The foregoing data structure is merely an example, and the present disclosure is not limited thereto.

Those skilled in the art will appreciate that the various illustrative logical blocks, modules, processors, means, circuits, and algorithm operations described in relationship to the example embodiments disclosed herein may be implemented by electronic hardware (for convenience, called "software" herein), various forms of program or design code, or a combination thereof. In order to clearly describe compatibility of the hardware and the software, various illustrative components, blocks, modules, circuits, and operations are generally illustrated above in relation to the functions of the hardware and the software. Whether the function is implemented as hardware or software depends on design limits given to a specific application or an entire system. Those skilled in the art may perform the function described by various schemes for each specific application, but it shall not be construed that the determinations of the performance depart from the scope of the present disclosure.

Various example embodiments presented herein may be implemented by a method, a device, or a manufactured article using a standard programming and/or engineering technology. A term "manufactured article" includes a computer program, a carrier, or a medium accessible from a predetermined computer-readable storage device. For example, the computer-readable storage medium includes a magnetic storage device (for example, a hard disk, a floppy disk, and a magnetic strip), an optical disk (for example, a CD and a DVD), a smart card, and a flash memory device (for example, an EEPROM, a card, a stick, and a key drive), but is not limited thereto. Further, various storage media presented herein include one or more devices and/or other machine-readable media for storing information.

It shall be understood that a specific order or a hierarchical structure of the operations included in the presented processes is an example of illustrative accesses. It shall be understood that a specific order or a hierarchical structure of the operations included in the processes may be rearranged within the scope of the present disclosure based on design priorities. The accompanying method claims provide various operations of elements in a sample order, but it does not mean that the claims are limited to the presented specific order or hierarchical structure.

The description of the presented example embodiments is provided so as for those skilled in the art to use or carry out the present disclosure. Various modifications of the example embodiments may be apparent to those skilled in the art, and general principles defined herein may be applied to other example embodiments without departing from the scope of the present disclosure. Therefore, the present disclosure is not limited to the example embodiments presented herein, and shall be interpreted in the broadest range consistent with the principles and the new characteristics presented herein. The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for managing an index in active-active database cluster environment comprising:
   setting an exclusive modification authority of a first instance for a first data block corresponding to a first transaction of the first instance, wherein the first data block is related to a first index node group including index nodes which participate in an index structure change which occurs by the first transaction;
   verifying the exclusive modification authority of a second data block corresponding to a second transaction of a second instance, wherein the second data block is related to a second index node group including index nodes which participate in the index structure change which occurs by the second transaction; and
   when the exclusive modification authority of the first instance for at least a part of the second data block is identified, making an access of the second transaction of modifying a data block in which the exclusive modification authority of the first instance is set in the second data block be waited until when the exclusive modification authority of the first instance is released, wherein the exclusive modification authority of the first instance remains until when the index structure change of the index nodes included in the first index group has been completed, and wherein index nodes which participate in the index structure change are grouped into one or more groups and an exclusive modification authority of each of groups is managed by each of a plurality of instances.

2. The method of claim 1, wherein the setting of the exclusive modification authority of the first instance for the first data block corresponding to the first transaction of the first instance includes:
when the index structure change occurs by the first transaction, determining the first index node group which participates in the index structure change which occurs by the first transaction,
verifying the exclusive modification authority for the first data block related to the first index node group by referencing an instance memory area of the first instance, and
when the exclusive modification authority for the first data block is not set, setting the exclusive modification authority of the first instance for the first data block.

3. The method of claim 2, wherein the setting of the exclusive modification authority of the first instance for the first data block corresponding to the first transaction of the first instance further includes:
storing first modification authority information for setting the exclusive modification authority of the first instance for the first data block in the instance memory area of the first instance, and
transmitting the first modification authority information to an instance memory area of the second instance to store the first modification authority information in the instance memory area of the second instance.

4. The method of claim 3, wherein the setting of the exclusive modification authority of the first instance for the first data block corresponding to the first transaction of the first instance further includes:
storing identification information for the first index node group in a transaction memory area of the first transaction.

5. The method of claim 4, further comprising:
setting the exclusive modification authority of the first instance for the first data block, and then modifying the first data block by the first transaction so as to perform the index structure change which occurs by the first transaction,
wherein the modifying of the first data block by the first transaction to perform the index structure change which occurs by the first transaction includes:
in the case of modifying the first data block by the first transaction, displaying that the index structure change is being conducted by the first transaction on the first index node group which participates in the index structure change.

6. The method of claim 5, wherein the verifying of the exclusive modification authority of the second data block corresponding to the second transaction of the second instance includes:
verifying the exclusive modification authority for the second data block by referencing the instance memory area of the second instance.

7. The method of claim 6, further comprising:
canceling the exclusive modification authority of the first instance for the first data block when the first transaction is committed or rolled back after the exclusive modification authority of the first instance for the first data block is set.

8. The method of claim 7, wherein the canceling of the exclusive modification authority of the first instance for the first data block includes:
canceling the first modification authority information on the instance memory area of the first instance by referencing the identification information for the first index node group stored in the transaction memory area of the first transaction, and
transmitting second modification authority information for canceling the first modification authority information on the instance memory area of the second instance to the instance memory area of the second instance.

9. The method of claim 8, further comprising:
when the exclusive modification authority of the first instance for the first data block is cancelled, setting the exclusive modification authority of the second instance for a data block in which the exclusive modification authority of the first instance is cancelled in the second data block.

10. The method of claim 9, further comprising:
when the exclusive modification authority of the second instance is set for the data block in which the exclusive modification authority of the first instance in the second data block is cancelled, permitting the access of the second transaction of modifying the data block in which the exclusive modification authority of the first instance is cancelled in the second data block.

11. The method of claim 10, wherein permitting of the access of the second transaction of modifying the data block in which the exclusive modification authority of the first instance is cancelled in the second data block includes:
after the exclusive modification authority of the second instance is set for the data block in which the exclusive modification authority of the first instance in the second data block is cancelled, accessing the second data block by the second transaction in order to perform the index structure change which occurs by the second transaction,
in the case of accessing the second data block by the second transaction, checking whether there is a index node displaying that the index structure change is being conducted in the second index node group which participates in the index structure change which occurs by the second transaction,
when verifying the index node displaying that the index structure change is being conducted by the first transaction in the second index node group, requesting a transaction table to the first instance by the second transaction, and
when verifying that the first transaction is committed or rolled back based on the transaction table, modifying the second data block by the second transaction so as to perform the index structure change which occurs by the second transaction.

12. The method of claim 11, wherein the modifying of the second data block by the second transaction to perform the index structure change which occurs by the second transaction includes:
in the case of modifying the second data block by the second transaction, displaying that the index structure change is being conducted by the second transaction on the second index node group which participates in the index structure change.

13. The method of claim 1, further comprising:
permitting the access of the second transaction of the second instance without verifying the exclusive modification authority for the referenced data block when the second transaction of the second instance references the data block.

14. The method of claim 1,
wherein the index structure change includes changing a structure of a B-tree index,
wherein the B-tree index includes a plurality of nodes, and
wherein changing the structure of the B-tree index includes segmenting at least one node of the plurality of nodes.

15. The method of claim 14, wherein segmenting at least one node of the plurality of nodes includes:
generating a new node; and
inserting the new node among the plurality of nodes,
wherein changing the structure of the B-tree index secures additional available space within the B-tree index.

16. The method of claim 15, further comprising:
based on determining that the new node not being used, deleting the generated new node in order to increase space use efficiency of the B-tree index.

17. A database server for managing an index in active-active database cluster environment, comprising:
a processor including at least one core; and
a memory including program codes executable by the processor,
wherein the processor performs:
setting an exclusive modification authority of a first instance for a first data block corresponding to a first transaction of the first instance, wherein the first data block is related to a first index node group including index nodes which participate in an index structure change which occurs by the first transaction,
verifying the exclusive modification authority of a second data block corresponding to a second transaction of a second instance, wherein the second data block is related to a second index node group including index nodes which participate in the index structure change which occurs by the second transaction, and
when the exclusive modification authority of the first instance for at least a part of the second data block is identified, making an access of the second transaction of modifying a data block in which the exclusive modification authority of the first instance is set in the second data block be waited until when the exclusive modification authority of the first instance is released, wherein the exclusive modification authority of the first instance remains until when the index structure change of the index nodes included in the first index group has been completed, and wherein index nodes which participate in the index structure change are grouped into one or more groups and an exclusive modification authority of each of groups is managed by each of a plurality of instances.

18. A non-transitory computer-readable storage medium storing a computer program which is configured to cause one or more processors to perform operations for performing a method for managing an index in active-active database cluster environment when the computer program is executed by one or more processors, wherein the method comprises:
setting an exclusive modification authority of a first instance for a first data block corresponding to a first transaction of the first instance, wherein the first data block is related to a first index node group including index nodes which participate in an index structure change which occurs by the first transaction;
verifying the exclusive modification authority of a second data block corresponding to a second transaction of a second instance, wherein the second data block is related to a second index node group including index nodes which participate in the index structure change which occurs by the second transaction; and
when the exclusive modification authority of the first instance for at least a part of the second data block is identified, making an access of the second transaction of modifying a data block in which the exclusive modification authority of the first instance is set in the second data block be waited until when the exclusive modification authority of the first instance is released, wherein the exclusive modification authority of the first instance remains until when the index structure change of the index nodes included in the first index group has been completed, and wherein index nodes which participate in the index structure change are grouped into one or more groups and an exclusive modification authority of each of groups is managed by each of a plurality of instances.

* * * * *